US011930476B2

(12) United States Patent
Takeuchi

(10) Patent No.: US 11,930,476 B2
(45) Date of Patent: Mar. 12, 2024

(54) SENSOR INFORMATION INTEGRATION SYSTEM, SENSOR INFORMATION INTEGRATION METHOD, PROGRAM, AND RECORDING MEDIUM

(71) Applicant: NEC Corporation, Tokyo (JP)

(72) Inventor: Toshiki Takeuchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 416 days.

(21) Appl. No.: 17/284,609

(22) PCT Filed: Oct. 9, 2019

(86) PCT No.: PCT/JP2019/039813
§ 371 (c)(1),
(2) Date: Apr. 12, 2021

(87) PCT Pub. No.: WO2020/090390
PCT Pub. Date: May 7, 2020

(65) Prior Publication Data
US 2021/0345286 A1    Nov. 4, 2021

(30) Foreign Application Priority Data
Oct. 29, 2018    (JP) ................... 2018-203146

(51) Int. Cl.
*H04W 4/02*    (2018.01)
*G06T 7/20*    (2017.01)
(Continued)

(52) U.S. Cl.
CPC ............... *H04W 64/00* (2013.01); *G06T 7/20* (2013.01); *G06T 7/70* (2017.01); *H04W 4/029* (2018.02)

(58) Field of Classification Search
CPC ............................... H04W 64/00; H04W 4/02
See application file for complete search history.

(56) References Cited

U.S. PATENT DOCUMENTS

| 2005/0074167 A1 | 4/2005 | Maeda et al. |
| 2008/0229223 A1* | 9/2008 | Kake ..................... G06F 3/0481 |
| | | 715/764 |

(Continued)

FOREIGN PATENT DOCUMENTS

| JP | 2002176474 A | 6/2002 |
| JP | 2005115544 A | 4/2005 |

(Continued)

OTHER PUBLICATIONS

English translation of Written opinion for PCT Application No. PCT/JP2019/039813, dated Nov. 19, 2019.

(Continued)

*Primary Examiner* — Michael T Vu

(57) ABSTRACT

The present invention is designed to make it possible to draw proper associations, when integrating pieces of information estimated in individual sensors, by associating between objects sensed by a plurality of sensors. A sensor information integration system 101 includes a radio frame analyzing section 33 configured to analyze a radio frame transmitted from a first object, to extract the first attribute information, an image analyzing section 40 configured to analyze an image, in which a second object is sensed, to extract second attribute information, and an association judging section 21 configured to judge an association between the first object and the second object, using the first attribute information and the second attribute information.

16 Claims, 16 Drawing Sheets

(51) Int. Cl.
*G06T 7/70* (2017.01)
*H04W 4/029* (2018.01)
*H04W 64/00* (2009.01)

(56) References Cited

U.S. PATENT DOCUMENTS

2009/0310528 A1    12/2009  Tamura
2011/0205358 A1*   8/2011  Aota ..................... G01S 19/23
                                                                    348/143
2018/0374354 A1*  12/2018  Akiyama ............ G08G 1/0133

FOREIGN PATENT DOCUMENTS

| JP | 2006060532 A | 3/2006 |
| --- | --- | --- |
| JP | 2006194649 A | 7/2006 |
| JP | 2008059261 A | 3/2008 |
| JP | 2009284442 A | 12/2009 |
| JP | 2009294899 A | 12/2009 |
| JP | 2009303170 A | 12/2009 |
| JP | 2016095701 A | 5/2016 |
| WO | 2009113265 A1 | 9/2009 |

OTHER PUBLICATIONS

International Search Report of PCT Application No. PCT/JP2019/039813 dated Nov. 19, 2019.

* cited by examiner

| ATTRIBUTE (BEHAVIOR) | ATTRIBUTE MATCHING DEGREE OF A1 BASED ON IMAGE ANALYSIS | ATTRIBUTE MATCHING DEGREE OF B1 BASED ON RADIO WAVE DETECTION | ATTRIBUTE MATCHING DEGREE OF B2 BASED ON RADIO WAVE DETECTION |
|---|---|---|---|
| PERSON (STANDBY) | 0.3 | 0.9 | 0.1 |
| PERSON (OPERATING) | 0.5 | 0.3 | 0.5 |
| PERSON (TALKING) | 0.8 | 0.1 | 0.9 |
| UAV (UL) (DRONE SIDE) | 0.1 | 0.1 | 0.8 |
| UAV (LL) (CONTROLLER SIDE) | 0.4 | 0.8 | 0.1 |
| VEHICLE | 0.1 | 0.3 | 0.5 |

Fig. 7

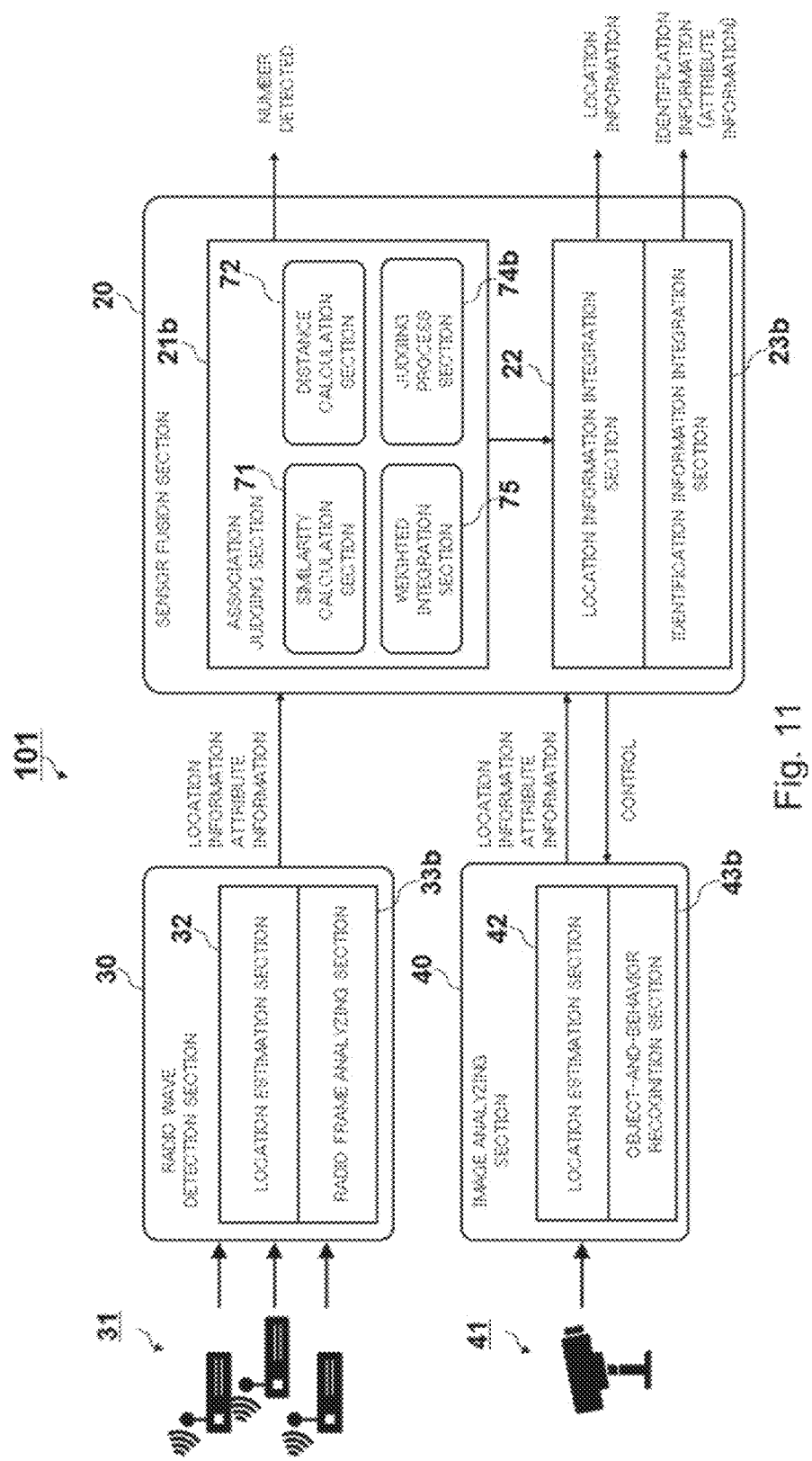

SENSOR INFORMATION INTEGRATION SYSTEM, SENSOR INFORMATION INTEGRATION METHOD, PROGRAM, AND RECORDING MEDIUM

This application is a National Stage Entry of PCT/JP2019/039813 filed on Oct. 9, 2019, which claims priority from Japanese Patent Application 2018-203146 filed on Oct. 29, 2018, the contents of all of which are incorporated herein by reference, in their entirety.

BACKGROUND

Technical Field

The present invention relates to a sensor information integration system for integrating sensor information obtained by a plurality of sensors such as cameras, radio wave sensors and so on, a sensor information integration method, a program, and a recording medium.

Background Art

Systems have been proposed, which use various types of sensors such as cameras, radars, radio wave sensors, and sound wave sensors, to sense and identify objects (including people) and terminals, and to estimate and track the locations of these objects.

Furthermore, in recent years, multi-sensor integrating/coordinating (sensor fusion) systems have also been proposed, which can complement the advantages and disadvantages that individual sensors each have, by integrating the location information and identification information obtained through each sensor, and which furthermore can track objects by covering the blind spots of some sensors.

In order to integrate the location information and identification information of objects sensed in various types of sensors for improved accuracy, it is important to associate between objects that are sensed by individual sensors, and show which objects are the same object—that is, it is important to draw associations between objects (also referred to as "linking", "name matching", "identification", "matching", etc.). When an object has its associations drawn properly, it is possible to integrate information related to that object from a plurality of sensors, for improved accuracy. On the other hand, if an object has its associations drawn improperly, different objects may be judged as being one object, which might lead to faulty sensing and therefore a decrease in accuracy. Consequently, the process of associating between objects sensed by a plurality of sensors is an important process in multi-sensor integrating/coordinating (sensor fusion) systems.

Now, to illustrate one major method for drawing associations, for example, PTL 1 to 3 disclose methods to use location estimation information of objects obtained through individual sensors.

CITATION LIST

Patent Literature

[PTL 1] JP 2009-284442 A
[PTL 2] WO 2009/113265
[PTL 3] JP 2006-060532 A

SUMMARY

Technical Problem

However, assuming a case in which whether or not it is possible to associate between objects sensed by individual sensors is judged based only on information about the distances between these objects, as in the techniques disclosed in PTL 1 to PTL 3, if a plurality of objects are present in a given area, problems might then occur such as these objects are associated wrongly or cannot be associated, due to the accuracy of location estimation of all sensors.

For example, the accuracy of location estimation for radio-wave transmitting sources based on radio wave strength depends on at what intervals the radio wave sensors and/or the like are provided, which might vary, for example, from several meters to several tens of meters, approximately. Also, the accuracy of location estimation for objects based on image information using cameras depends on the distance from the camera to the object, and is approximately several meters, for example. Also, there can be a trade-off between with what reliability associations can be drawn and the time it takes to draw associations. Consequently, the techniques described above have a problem of having difficulty drawing associations with high reliability, in a short time.

It is therefore an object of the present invention to make it possible to draw proper associations, when integrating information estimated in individual sensors, by associating between objects sensed by a plurality of sensors.

Solution to Problem

According to one aspect of the present invention, an information integration system includes a radio frame analyzing unit configured to analyze a radio frame transmitted from a first object, to extract first attribute information related to the first object, an image analyzing unit configured to analyze an image, in which a second object is sensed, to extract second attribute information related to the second object, from a plurality of pieces of attribute information given based on at least one of a plurality of images and information of one or more objects, and an association judging unit configured to judge an association between the first object and the second object, using the first attribute information and the second attribute information.

According to one aspect of the present invention, an information integration method includes analyzing a radio frame transmitted from a first object, to extract first attribute information related to the first object, analyzing an image, in which a second object is sensed, to extract second attribute information related to the second object, from a plurality of pieces of attribute information given based on at least one of a plurality of images and information of one or more objects, and judging an association between the first object and the second object, using the first attribute information and the second attribute information.

According to one aspect of the present invention, a program causes a processor to execute analyzing a radio frame transmitted from a first object, to extract first attribute information related to the first object, analyzing an image, in which a second object is sensed, to extract second attribute information related to the second object, from a plurality of pieces of attribute information given based on at least one of a plurality of images and information of one or more objects, and judging an association between the first object and the second object, using the first attribute information and the second attribute information.

According to one aspect of the present invention, a non-transitory computer readable recording medium stores a program that causes a processor to execute analyzing a radio frame transmitted from a first object, to extract first attribute information related to the first object, analyzing an image, in which a second object is sensed, to extract second attribute information related to the second object, from a plurality of pieces of attribute information given based on at least one of a plurality of images and information of one or more objects, and judging an association between the first object and the second object, using the first attribute information and the second attribute information.

Advantageous Effects of Invention

According to the present invention, it is possible to draw proper associations, when integrating information estimated in individual sensors, by associating between objects sensed by a plurality of sensors. Note that the present invention may bring about, instead of this advantageous effect, or with this advantageous effect, other advantageous effects as well.

BRIEF DESCRIPTION OF THE DRAWINGS

FIG. 7 is a table to show the degrees of matching with each attribute in a sensing object A1, estimated by an image analyzing section 40, and the degrees of matching with each attribute in sensing objects B1 and B2, estimated in the radio wave detection section 30;

FIGS. 10A and 6B provide diagrams to show examples of advantageous effects according to the present example embodiment;

FIG. 11 is a diagram to show an overall configuration of a sensor information integration system 101 according to a second example embodiment;

DESCRIPTION OF THE EXAMPLE EMBODIMENTS

Figure 1:
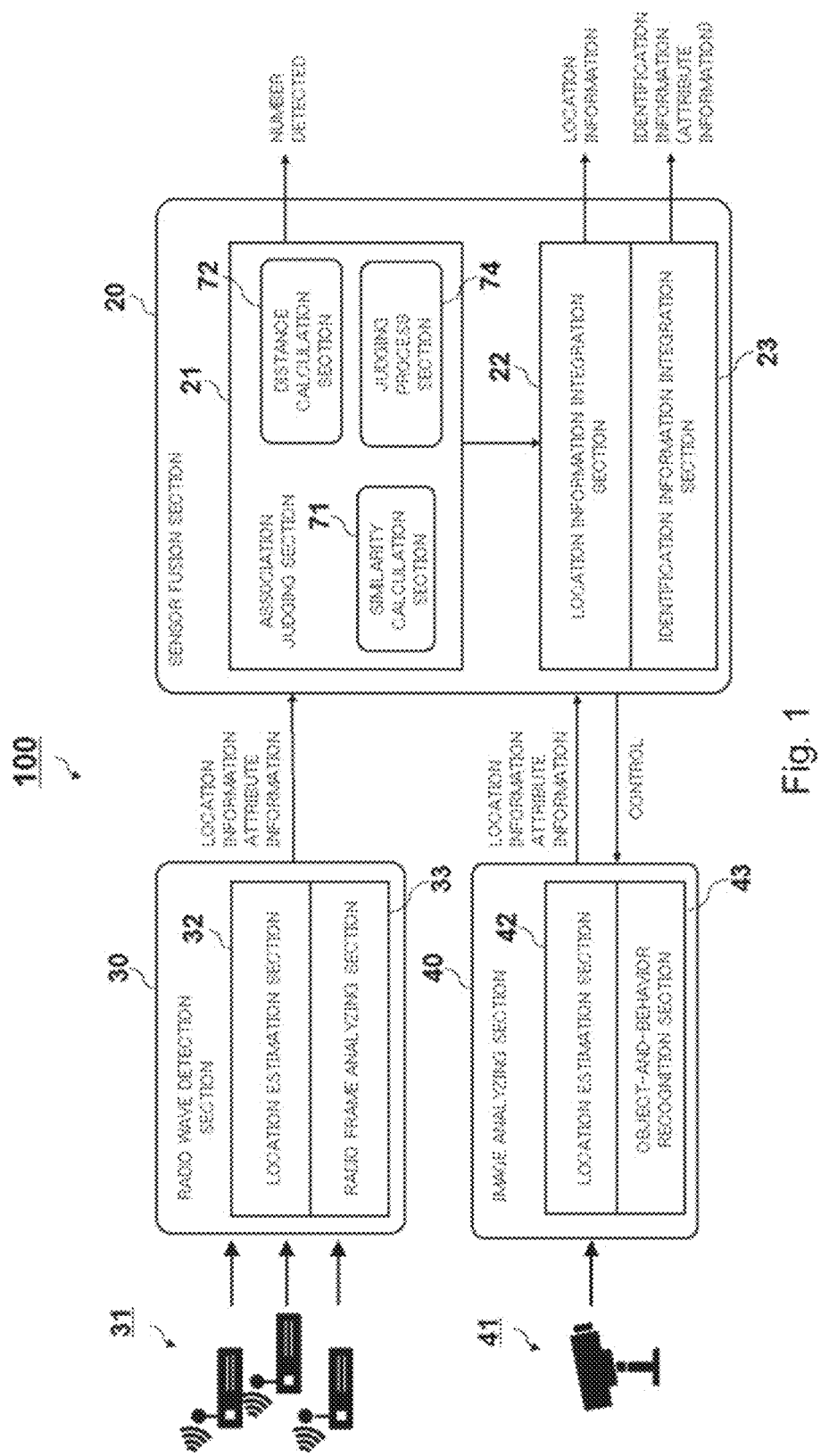
FIG. 1 is a diagram to show an overall configuration of a sensor information integration system 100 according to a first example embodiment.

Hereinafter, example embodiments according to the present disclosure will be described in detail with reference to the accompanying drawings. Note that, in the Specification and the drawings, elements that can be described in the same or similar terms will be assigned the same reference signs, and overlapping description may be omitted.

The description will be given in the following order:
1. Summary of Example Embodiments of the Present Invention
2. First Example Embodiment
3. Second Example Embodiment
4. Third Example Embodiment
5. Advantageous Effects of Example Embodiments
6. Other Examples

1. SUMMARY OF EXAMPLE EMBODIMENTS OF THE PRESENT INVENTION

First, a summary of example embodiments of the present invention will be described.

(1) Technical Problem

Systems have been proposed, which use various types of sensors such as cameras, radars, radio wave sensors, and sound wave sensors, to sense and identify objects (including people) and terminals, and to estimate and track the locations of these objects.

Furthermore, in recent years, multi-sensor integrating/coordinating (sensor fusion) systems have also been proposed, which can complement the advantages and disadvantages that individual sensors each have, by integrating the location information and identification information obtained through each sensor, and which furthermore can track objects by covering the blind spots of some sensors.

In order to integrate the location information and identification information of objects sensed in various types of sensors for improved accuracy, it is important to associate between objects that are sensed by individual sensors, and show which objects are the same object—that is, it is important to draw associations between objects (also referred to as "linking", "name matching", "identification", "matching", etc.). When an object has its associations drawn properly, it is possible to integrate information related to that object from a plurality of sensors, for improved accuracy. On the other hand, if an object has its associations drawn improperly, different objects may be judged as being one object, which might lead to faulty sensing and therefore a decrease in accuracy. Consequently, the process of associating between objects sensed by a plurality of sensors is an important process in multi-sensor integrating/coordinating (sensor fusion) systems.

Now, to illustrate one major method for drawing associations, for example, the following literature discloses methods to use location estimation information of objects obtained through individual sensors.

For example, JP 2009-284442A discloses apparatus that automatically recognizes the association between a person and a mobile terminal. To be more specific, the location of a person sensed by a camera is compared with the location of a mobile terminal sensed by a radio wave sensor, and, when the distance between them is equal to or less than a threshold, the person is associated with the mobile terminal. By this means, it becomes possible to properly offer the communication terminal's data and functions to the corresponding person. However, in this case, only the distance between the sensed person and the sensed mobile terminal is used as information for associating between them. Therefore, depending on the accuracy of location estimation of both sensors and the threshold for judging the association, problems might occur such as the association is drawn wrongly or cannot be judged. To be more specific, if a relatively small threshold is set, the possibility is high that the true object will be excluded from the associating candidates and placed in wrong associations. On the other hand, if a relatively large threshold is set, the possibility is high that a plurality of objects will be associating candidates, which makes it difficult to draw proper associations.

Also, WO 2009/113265 proposes a system for specifying the location of a monitoring object based on radio communication with a radio terminal and based on photographed images of the monitoring object. To be more specific, WO 2009/113265 discloses a method of comparing the accuracy of positioning by all sensors to select the object to search for as a starting point, set the search range, and so on. By this means, the accuracy of specifying locations can be improved by associating between objects and then integrating location information in a probabilistic fashion. However, in this case, too, location information alone is used as the information for judging associations. Consequently, if there are a plurality of objects in a certain range, the problem arises that more wrong associations are drawn, or that it takes a long time to draw associations (increased difficulty drawing associations), depending on the accuracy of location estimation.

Furthermore, J P 2006-060532 A discloses specifying the locations of individual players in a pitch based on the electric field strength of radio waves transmitted from the radio tag that each player playing the game in the pitch carries with him/her, and, when it is determined that one or more players have entered the photographing area in the broadcast source image, the attribute information of the entered players is shown synthesized with the broadcast source image. In this case, it is possible to improve the accuracy of location estimation by using a plurality of directional antennas, but, as mentioned earlier, the problem arises that a plurality of objects (players, for example) that are present within a certain range cannot be distinguished from each other.

Assuming a case in which whether or not it is possible to associate between objects sensed by individual sensors, is judged based only on information about the distances between these objects, as in the techniques described above, if a plurality of objects are present in a given area, problems might then occur such as wrong associations are drawn, or associations cannot be drawn, between the objects, due to the accuracy of location estimation of all sensors.

For example, the accuracy of location estimation for radio-wave transmitting sources based on radio wave strength depends on at what intervals the radio wave sensors and/or the like are provided, which might vary, for example, from several meters to several tens of meters, approximately.

Also, the accuracy of location estimation for objects based on image information using cameras depends on the distance from the camera to the object, and is approximately several meters, for example.

Consequently, when a plurality of sensing objects, such as people, terminals and/or the like are present in a range of several meters, and a relatively low threshold is set, there is a higher possibility that the true object will be excluded from the associating candidates and placed in wrong associations. On the other hand, if a relatively large threshold is set, the possibility is high that a plurality of objects will be associating candidates, which makes it difficult to draw proper associations. Furthermore, there can be a trade-off between with what reliability associations can be drawn, and the time it takes to draw associations. Consequently, the techniques described above have a problem of having difficulty drawing associations with high reliability, in a short time.

It is therefore an example object of the present example embodiment to make it possible to draw proper associations, when integrating pieces of information estimated in individual sensors, by associating between objects sensed by a plurality of sensors. To be more specific, an example object of the present example embodiment is to associate between objects sensed by a plurality of sensors with high reliability, in a short time.

(2) Technical Features

An example embodiment of the present invention, for example, analyzes a radio frame transmitted from the first object, to extract the first attribute information related to the first object, analyzes an image, in which a second object is sensed, to extract second attribute information related to the second object, from a plurality of pieces of attribute information given based on at least one of a plurality of images and information of one or more objects, and judges the association between the first object and the second object, using the first attribute information and the second attribute information.

By this means, for example, when objects sensed by a plurality of sensors are associated with each other and pieces of information estimated in individual sensors are integrated, it becomes possible to draw proper associations.

Furthermore, the first attribute information includes at least one of information includes at least one of information related to the entity in which the first object is installed, information related to the communication node to which the radio frame is transmitted, and information related to the communication operation of the first object.

For example, the information related to the entity with the first object installed includes at least one of information indicating the type of the entity (terminal, vehicle, ship, UAV, etc.), information related to the model name or the manufacturing vendor of the entity, and information related to the country of manufacture or the country of destination of the entity. The information related to the communication node to which the radio frame is transmitted includes information related to hub station (for example, a gateway) or a terminal station (for example, a sensor station) for a sensor network. The information related to the communication operation of the first object includes information related to the operation of any one of standby, operating, and talking. More specific examples of these pieces of information will be described later.

Furthermore, the second attribute information includes at least one of, for example, information identifying the second object, information related to the communication operation of the second object, and information related to the arrangement of an antenna attached to the second object. Furthermore, the information identifying the second object includes information related to at least one of the age, sex, and birthplace of a person.

The information identifying the second object includes information indicating the type of the second object, and information related to at least one of the age, sex, and birthplace of a person. Furthermore, the information related to the communication operation of the second object includes information related to the operation of any one of standby, operating, and talking. Furthermore, the information related to the arrangement of the antenna attached to the second object includes information related to extension or storage of the antenna. More specific examples of these pieces of information will be described later.

Note that the technical features described above are simply specific examples of example embodiments of the present invention, and the example embodiments of the present invention are by no means limited to the technical features described above.

According to the present example embodiment, not only location information of a transmitting source is estimated using received radio waves, but also attribute information (behavior information) of the transmitting source is estimated by using radio frame information such as its frequency, received power, frame length, header, and transfer frequency. Also, based on image analysis using image information from cameras, both location information and attribute information (behavior information) are estimated. Then, associations are drawn by taking into account the location information of both, and, additionally, by taking into account the attribute information of both, and the associations are weighted by taking into account the accuracy of estimation of both, and therefore judged with higher reliability.

That is, co-occurrence relationship in which simultaneous occurrence is likely is extracted from the result of radio frame analysis for estimating the behavior of an object using information about received radio waves and the result of image analysis for estimating the object and its action (behavior) using images is extracted and associated (linked).

In this way, not only location information (distance information) of objects sensed by individual sensors, but also attribute information (behavior information) of the objects is used in judging their associations, so that the reliability of associations can be improved. For example, assuming that a plurality of objects are present nearby (within a certain area), if location information alone is available for use, the reliability of their associations drops depending on the accuracy of location estimation by each sensor. However, if every object has independent attribute information (behavior information), associations can be drawn with higher reliability.

Also, as a secondary advantageous effect, if sensor information can be integrated (linked) with high accuracy, attribute information that is obtained can be complementarily combined and complemented, so that the performance of identifying objects is also improved. For example, it is possible to estimate that "a child operating a UAV" has entered an exclusion zone. Alternatively, it is possible to estimate that "the vehicle at point x=35, y=450 is a hub station of an autonomous network of a business group (privately-owned network) A".

Below, example embodiments of the present invention will be described in detail with reference to FIG. 1 to FIG. 15. With the first example embodiment, the basic configurations, features, and operations of a radio wave detection section that analyzes radio signals from radio wave sensors, an image analyzing section that analyzes images from cameras, and a sensor fusion section that integrates the radio wave analysis result and the image analysis result will be described in detail, as an example of a sensor information integration system.

Also, with a second example embodiment, an example case will be described in which the threshold for use in the process of judging associations using accuracy information of location estimation from each sensor is calculated for every candidate point, so that the reliability of location estimation, which changes dynamically per candidate point, is actively utilized in judging associations.

2. FIRST EXAMPLE EMBODIMENT (1) Configuration

FIG. 1 is a diagram to show an overall configuration of a sensor information integration system 100 according to the first example embodiment. In this diagram, the sensor information integration system 100 includes various types of sensor analyzing sections such as a radio wave detection section and an image analyzing section, and associates between and integrates radio wave analysis results and image analysis results in a sensor fusion section, and improves the accuracy of location information and identification information.

That is, the sensor information integration system 100 includes various types of sensor analyzing sections (radio wave detection section 30 and image analyzing section 40) and a sensor fusion section 20. Also, the sensor information integration system 100 may include one or more radio wave sensors 31 and one or more cameras 41 as data input means. The radio wave detection section 30 includes a location estimation section 32 and a radio frame analyzing section 33. Also, the image analyzing section 40 includes a location estimation section 42 and an object-and-behavior recognition section 43. Note that the sensor information integration system 100 may include, as various types of sensor analyzing sections, in addition to the radio wave detection section 30 and the image analyzing section 40, other sensor analyzing sections that analyze signals obtained in various radars, lasers (Light Detection and Ranging: LiDAR), acoustic sensors and so forth.

Using, for example, strength information of the radio waves received in a plurality of radio wave sensors 31, the radio wave detection section 30 estimates the location of a transmitting source (the first object) in the location estimation section 32, the and outputs location estimation information. Here, the location estimation section 32 may also calculate and output accuracy information (error probability distribution, standard deviation, etc.) in the location estimation process.

The radio frame analyzing section 33 analyzes the radio frame transmitted from the first object, and extracts the first attribute information related to that first object. To be more specific, the radio frame analyzing section 33 estimates the attributes and behavior of the transmitting source (the first object) by using radio frame information such as the frequency, received power, frame length, header, and transfer frequency of the radio waves received from the first object, and outputs the first attribute information (behavior information).

Also, the image analyzing section 40 performs an image analyzing process such as face recognition, human recognition, object recognition and moving object sensing, by using image information of a second object photographed by a camera 41, and estimates the location of that sensed second object. To be more specific, the location estimation section 42 performs a location estimation process of the recognition object (the second object). Note that the location estimation section 42 may together output accuracy information (error probability distribution, standard deviation, etc.) in the location estimation process.

The image analyzing section 40 (object-and-behavior recognition section 43) analyzes images in which the second object is sensed, and extracts second attribute information related to the second object, from among a plurality of pieces of attribute information that are based on at least one of a plurality of images and information about one or more objects. To be more specific, the image analyzing section 40 (object-and-behavior recognition section 43) performs object recognition, behavior recognition and so forth, based on image analysis such as machine learning using a plurality of images and analysis of characteristics included in the objects, and outputs the second attribute information (behavior information) of a recognized object (the second object).

Also, the sensor fusion section 20 includes an association judging section 21, a location information integration section 22, an identification information integration section 23 and so forth, and improves the accuracy of location information and identification information by integrating the location estimation information, accuracy information and identification information from the radio wave detection section 30 and the image analyzing section 40. The sensor fusion section 20 (association judging section 21) judges the association between the first object and the second object by using the first attribute information and the second attribute information. In other words, the sensor fusion section 20 (association judging section 21) judges which objects sensed by individual sensors are associated with each other. Then, based on the association result in the association judging section 21, the sensor fusion section 20 integrates the location information in the location information integration section 22, and integrates the identification information in the identification information integration section 23. In other words, the location information integration section 22 integrates the location information of sensing objects based on the result of judging associations in the association judging section 21, the location information of the first object, and the location information of the second object. Also, the identification information integration section 23 integrates the identification information of sensing objects by using the result of judging associations in the association judging section 21, the first attribute information, and the second attribute information.

Figure 2:
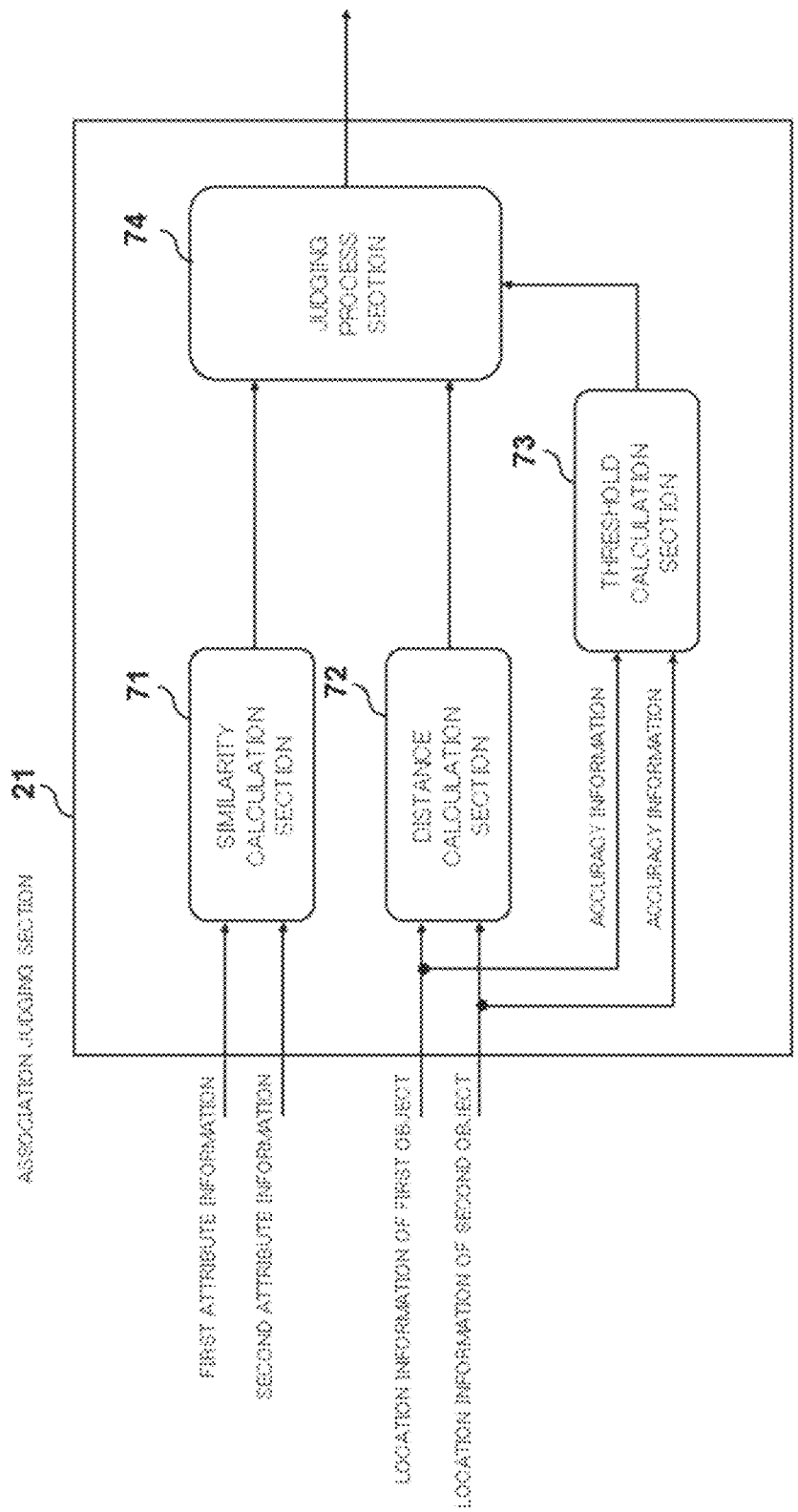
FIG. 2 is a diagram to show a specific example of the configuration of an association judging section 21.

Also, the association judging section 21 may judge the association between the first object and the second object, by additionally using the location information of the first object and the location information of the second object. FIG. 2 is a diagram to show a specific example of the configuration of the association judging section 21. As shown in FIG. 2, the association judging section 21 includes a similarity calculation section 71, a distance calculation section 72, a threshold calculation section 73, and a judging process section 74.

The similarity calculation section 71 calculates the similarity between the first attribute information and the second attribute information. In other words, based primarily on the attribute information (behavior information) of objects sensed by individual sensors such as the radio wave detection section 30 and the image analyzing section 40, the similarity calculation section 71 calculates the similarity between the objects' attribute information.

The distance calculation section 72 calculates the distance between sensed objects—that is, the distance between the first object and the second object—based on the location information of the objects estimated in each sensor (the location information of the first object and the location information of the second object).

The threshold calculation section 73 calculates the threshold for use in the association judging process, by using information about the accuracy of location estimation from each sensor. In other words, the threshold calculation section 73 calculates the threshold for use in the association judging process, by using location estimation accuracy information that is based on the location information of the first object and the location information of the second object.

The judging process section 74 judges whether associations can be drawn or not, by using the similarity between the objects found in the similarity calculation section 71, the distance between the objects found in the distance calculation section 72, and the threshold calculated in the threshold calculation section 73.

(2) Operation

Next, the operation of the sensor information integration system 100 according to the first example embodiment will be described with reference to FIG. 1 to FIG. 9.

First, as shown in FIG. 1, various types of sensor analysing sections such as the radio wave detection section 30 and the image analysing section 40 sense and identify objects (the first object and the second object), and perform the location estimation process for the objects. For example, the radio wave detection section 30 senses a specific transmitting source (the first object) based on radio wave information received in a plurality of radio wave sensors 31, and estimates the location of that transmitting source (the first object), in the location estimation section 32, by using the received radio waves' strength information, arrival time difference information and so forth. Also, the radio frame analysing section 33 estimates the attributes and behaviour of the transmitting source (the first object), by using radio frame information such as the frequency, the received power, the frame length, the header, and the frequency of transfer, of received radio waves, and output these as the first attribute information (behaviour information).

Also, the image analysing section 40 performs image analysing processes such as face recognition, human recognition, object recognition, and moving object sensing, by using the image information captured by the camera 41, and estimates the location coordinates of a recognition object (the second object) in the location estimation section 42. Also, the object-and-behaviour recognition section 43 performs object recognition and behaviour recognition based on image analysis, and outputs the second attribute information (behaviour information) of the recognition object (the second object).

Note that, upon the location estimation process of objects in the radio wave detection section 30 and the image analysing section 40, accuracy information of location estimation may be calculated in the location estimation sections 32 and 42. Examples of the accuracy information correspond to the probability distribution of location estimation likelihoods (two-dimensional Gaussian distribution, isotropic Gaussian distribution, normal distribution, etc.), its standard deviation, variance and so forth.

Figure 3:
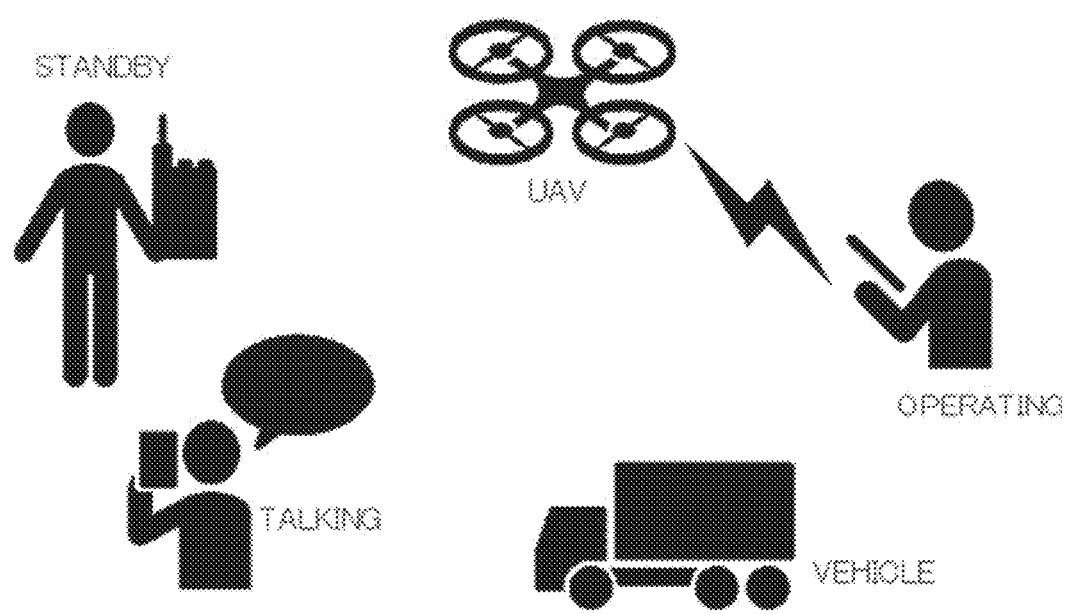
FIG. 3 is a diagram to show an example of second attribute information (behavior information) that is estimated in an object-and-behavior recognition section 43.

FIG. 3 is a diagram to show an example of the second attribute information (behaviour information) estimated in the object-and-behaviour recognition section 43. The objectand-behaviour recognition section 43 identifies the behaviour information of objects, people and so forth from images, by using various types of image analysing engines. As for the image analysing engines, for example, recognition engines to use machine learning or the like can be used. Referring to the example of FIG. 3, a UAV (Unmanned Aerial Vehicle) (drone), a vehicle and people (a person talking on the phone, a person operating a terminal, a person on standby, etc.) are identified as recognition objects. With respect to the operation of recognizing and identifying the UAV, vehicle, people ("talking", "operating", or "on standby") and so forth, a recognition engine using machine learning or the like has in advance a large number of photographed images and videos learned therein. In this case, the person holding his/her hand near his/her ear is learned as a "talking person", the person who has some kind of terminal near his/her chest or waist is learned as an "operating person", and the other person is learned as a "person on standby", and the behaviour of people may be classified accordingly. Then, the recognition results (classification results, the probability of being each recognition object, the degree of matching, etc.) of the UAV, the vehicle, the talking person, the operating person, the person on standby and so forth, are output as the second attribute information (behaviour information).

Figure 4A:
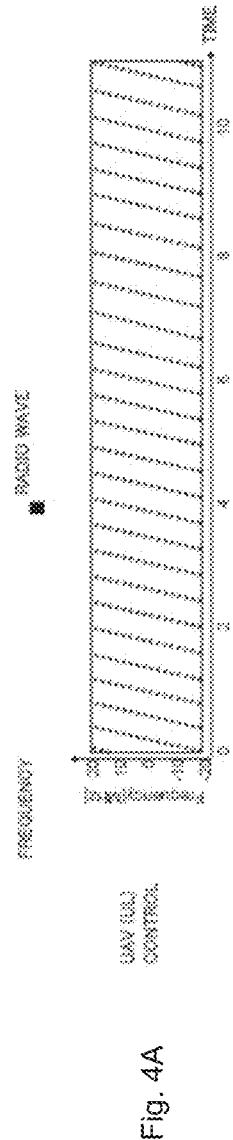
FIGS. 4A to 4E provide diagrams to show examples of first attribute information (behavior information) that is estimated in a radio frame analyzing section 33 in a radio wave detection section 30.
Figure 4B:
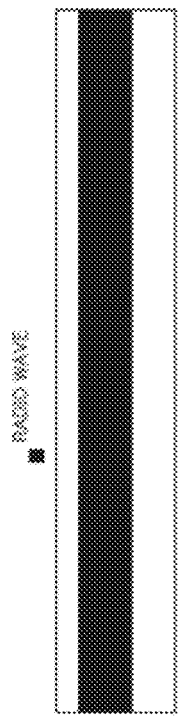
Figure 4C:
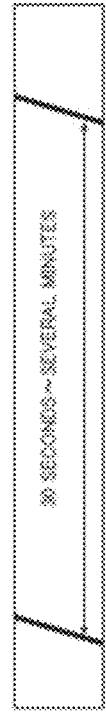
Figure 4D:
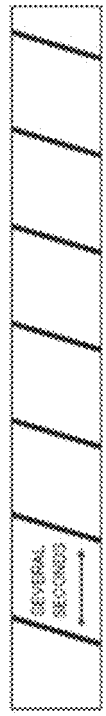
Figure 4E:
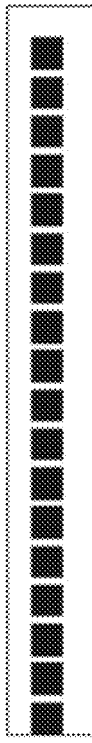

FIGS. 4A to 4E provide diagrams to show examples of the first attribute information (behaviour information) estimated by the radio frame analysing section 33 in the radio wave detection section 30. To be more specific, FIGS. 4A to 4E show an example of the first attribute information (behaviour information), in which, assuming that a radio device transmits radio waves in each state in which the UAV is on UL (UpLink, uplink control channel), the UAV is on DL (DownLink, downlink data channel), a mobile terminal is on standby, a mobile terminal is being operated, and a mobile termina is making a call, radio signal information is plotted in a schematic fashion, so as to represent the characteristics of radio waves transmitted from that radio device, with the vertical axis representing the frequency and the horizontal axis representing the time. For example, as shown in FIG. 4A in when the UAV is on UL (uplink control signal transmission), generally, a communication scheme based on frequency hopping (FH) scheme is used, so that, in its radio signal, the radio wave frequency band hops with time. As shown in FIG. 4B when the UAV is on DL (downlink data signal transmission), mostly the image data from the camera on the UAV is transmitted continuously, and therefore its radio signal occupies a certain frequency band. As shown in FIG. 4C, while a mobile terminal is on standby, radio signals are communicated at relatively long time intervals (for example, every 30 seconds to several minutes). For example, in Wi-Fi, this corresponds to the transmission interval of the probe request, and, in cellular communication such as LTE, this corresponds to the transmission interval of background communication and location registration updating. As shown in FIG. 4D while a mobile terminal is being operated, radio signals are communicated at relatively short time intervals (for example, every several seconds to several tens of seconds). This is because, for example, in Wi-Fi, the probe request is transmitted more often while a terminal is being operated than when the terminal is on standby, and because, in cellular communication such as LTE, communication such as web access and SNS take place. As shown in FIG. 4E while a mobile terminal is making a call, its radio signal complies with a protocol that supports voice communication. In other words, the radio signal substantially occupies a certain frequency band, and is communicated at a constant transmission rate.

So, the radio frame analysing section 33 analyses the radio signal frames that are received, thereby identifying between these UAV (UL), UAV (DL), mobile terminal (on standby), mobile terminal (being operated), mobile terminal (making a call), and so on. For example, the radio frame analysing section 33 may classify these in an analytical way, by using a signal analysing engine using machine learning, or by using information about the transfer interval for identifying between the communication schemes (frequency band, communication protocol, etc.) of the UAV and the mobile terminals, and the above-described behaviour. When the former machine learning-based analysing engine is used, a technique to pair the signal features (the received power, the received frequency, the packet length, the number of packets, the transfer interval, etc.) of radio waves received, with the right corresponding data (that is, information about each attribute (behaviour) of the UAV (UL), UAV (DL), mobile terminal (on standby), mobile terminal (being operated), mobile terminal (making a call), which are the targets of classification), input and learn a lot of data in advance, and do the classification, may be used. Also, when the latter approach of analytical classification is used, a technique to estimate which attribute information (behaviour information) is appropriate by extracting the above signal features when receiving radio waves and looking up a table, or by calculating the correlation and making judgment based on a threshold, may be used. Then, the identification results (classification result, the probability of being each attribute object, the degree of matching, etc.) of the UAV (UL), UAV (DL), mobile terminal (on standby), mobile terminal (being operated), mobile terminal (making a call) and so forth is output as the first attribute information (behaviour information).

Next, using the attribute information and location estimation information output from various types of sensor analyzing sections such as the radio wave detection section 30 and the image analyzing section 40, first, the sensor fusion section 20 judges, by means of the association judging section 21, which objects sensed by the various sensors correspond to each other (that is, judges the identification, linking, etc.). Then, when this judging of associations by the association judging section 21 finds out that a plurality of sensor analyzing sections have sensed the same (associated) object, the location estimation information related to that object from each sensor analyzing section is integrated in the location information integration section 22, thereby improving the accuracy of the object's location. Also, similarly, the accuracy of the object's identification information is improved by integrating the object's attribute information, identification information and so forth from each sensor analyzing section, in the identification information integration section 23.

Figure 5:
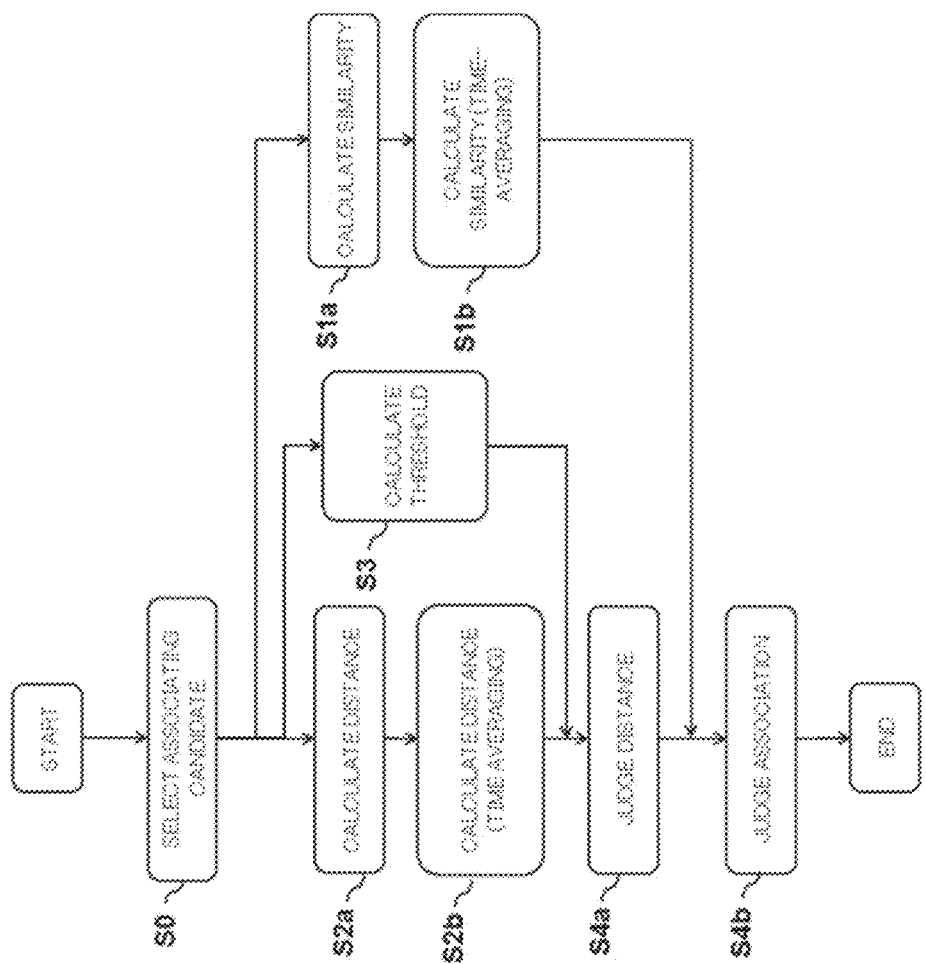
FIG. 5 is a diagram to show an example of the operation sequence of the association judging process in the association judging section 21.
Figure 6B:
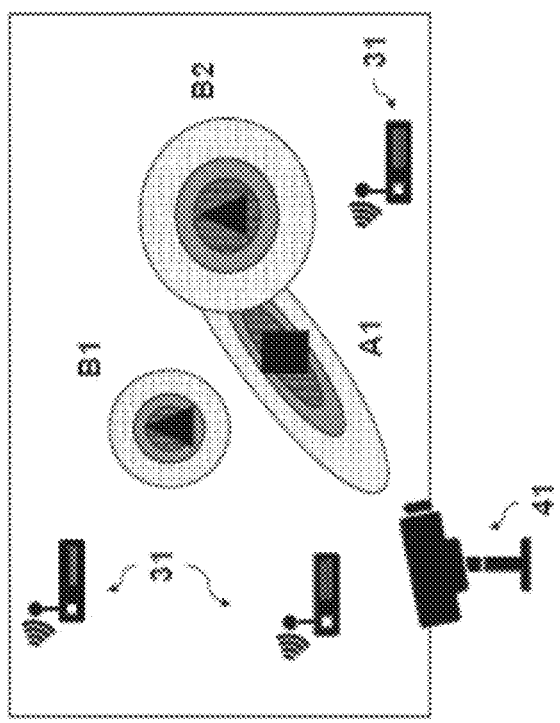
FIGS. 6A and 6B provide diagrams to show examples of sensing objects in the event a sensor A performs image analysis using a camera and a sensor B performs radio wave detection.
Figure 6A:
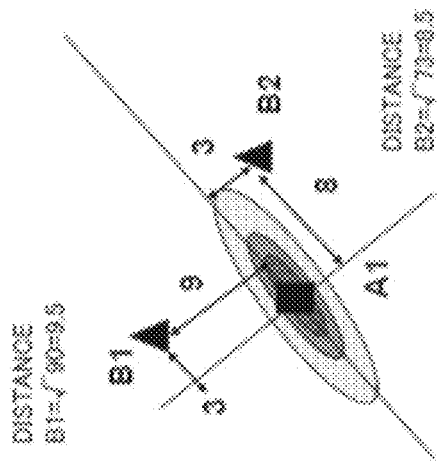

The operation of the association judging section 21 in the sensor fusion section 20 will be described in detail, with reference to FIG. 2 to FIG. 9. FIG. 5 is a diagram to show an example of the operation sequence of the association judging process in the association judging section 21. Also, FIGS. 6A and 6B provide diagrams to show examples of sensing objects, where a sensor A performs image analysis using a camera and a sensor B performs radio wave detection. Here, an example case to judge which of the sensing objects B1 and B2 of the sensor B (for example, the radio wave detection section 30) is associated with the sensing object A1 of the sensor A (for example, the image analyzing section 40) will be described.

First, given the group of objects sensed by both the image analyzing section 40 and the radio wave detection section 30, selection is made to judge which object (the first object) sensed by the radio wave detection section 30 can be an associating candidate for the object (the second object) sensed in the image analyzing section 40 (S0: associating candidate selection). As to the criterion of this selection, an object that is likely may be selected from the photographing location of each camera 41, the range in which each radio wave sensor 31 obtains signals, and so forth. For example, referring to the examples of FIGS. 6A and 6B, the sensing objects B1 and B2 in the photographing range are selected as objects sensed based on radio wave detection, as opposed to the object A1 sensed based on image analysis. Note that this process may be omitted if making all the objects sensed in both ways associating candidates raises no specific problem with regard to, for example, the amount of calculation.

Next, the distance calculation section 72 calculates the distances between the sensing objects of the sensors (S2a: distance calculation). To be more specific, the distance calculation section 72 calculates distances so as to judge which of the sensing objects B1 and B2 sensed in the sensor B (radio wave detection section 30) is associated, or whether neither of the sensing objects 131 and B2 is associated, with the sensing object A1 sensed in the sensor A (image analyzing section 40). An example of this distance calculation is shown in FIG. 6B. The distance is generally calculated by using a technique to calculate the Euclidean distance between each object.

Here, considering the case where the conditions for drawing associations are not fulfilled in the association judging process (described later) and the association judging process has to be repeated, the average of the distances calculated over time may be found (S2b: distance calculation (time averaging)). Here, in the time-averaging process, for example, assuming the example shown in FIG. 6B, for both the distance between A1 and 131 and the distance between A1 and B2, every time a location estimation result is input and a distance is calculated, the process of calculating the average over time is performed. Also, if the accuracy information (the values of the standard deviation, variance, etc.) changes dynamically every time location estimation is carried out in the sensor A or the sensor B, the average over time may be found by assigning weight per time, using the value of the standard deviation and/or the like. By this means, it becomes possible to improve the reliability.

Next, using the accuracy information from various types of sensors such as the radio wave detection section 30 and the image analyzing section 40, the threshold calculation section 73 calculates the threshold for use in the association judging process (described later) (S3a: threshold calculation). Although the example of FIG. 5 shows a sequence in which the threshold calculation process is performed in parallel with the distance calculation process, this is by no means limiting, and an operation sequence in which the calculation of the threshold takes place after the distance calculation process is carried out may be used. For example, in the example shown in FIGS. 6A and 6B the sensing object B2 is a candidate point, that is, an associating candidate for the sensing object A1. Then, in order to judge whether or not the sensing object B2 can be associated with the sensing object A1, the threshold calculation section 73 determines the threshold so that, for example, the association is judged possible only if the sensing object B2 alone is present in the areas within the threshold range from the sensing object A1.

For example, the sum of the accuracy information (standard deviation) of location estimation from the image analyzing section 40 and the accuracy information (standard deviation) of location estimation from the radio wave detection section 30 can be calculated as a threshold. Note that, considering the case where the conditions for drawing associations are not fulfilled in the association judging process (described later) and the association judging process has to be repeated, in the threshold calculation section 73, too, the average of the thresholds calculated over time may be found.

Next, the attribute (behavior) similarity calculation process in the similarity calculation section 71 will be described. To be more specific, where the sensing object A1 is sensed in the sensor A (image analyzing section 40), the attribute similarities of the sensing objects B1 and B2 sensed in the sensor B (radio wave detection section 30), each an associating candidate, are calculated (S1a: similarity calculation). FIG. 7 is a table to show the degrees of matching with each attribute in the sensing object A1, estimated in the image analyzing section 40, and the degrees of matching with each attribute in the sensing objects B1 and B2, estimated in the radio wave detection section 30. For example, 1.0 means that the degree of matching is estimated to be 100%, and 0.0 means that the degree of matching is estimated to be 0%. As to the calculation of the attribute similarities performed in the similarity calculation section 71, for example, the product of each attribute matching degree can be determined. In the example of FIG. 7, the attribute similarity between the sensing object A1 and the sensing object B1 is 0.27 (0.3×0.9) at the maximum in the attribute "person (standby)", and the attribute similarity between the sensing object A1 and the sensing object B2 is 0.72 (0.8×0.9) at the maximum in the attribute "person (talking)".

Here, considering the case where the conditions for drawing associations are not fulfilled in the association judging process (described later) and the association judging process has to be repeated, in the process of calculating attribute similarities, too, the average of the similarities calculated over time may be found (S1B: similarity calculation (averaging)), as in the distance calculation process.

Finally, the process of judging associations is performed in the judging process section 74. First, whether associations can be drawn or not is judged based on the distances between objects calculated in the distance calculation section 72 and the threshold calculated in the threshold calculation section 73 (S4a: distance determination process). Next, in the event associations cannot be drawn in the distance-based judging process, whether associations can be drawn or not is judged based on the attribute similarity information calculated in the similarity calculation section 71 (S4b: association judging process).

Figure 8:
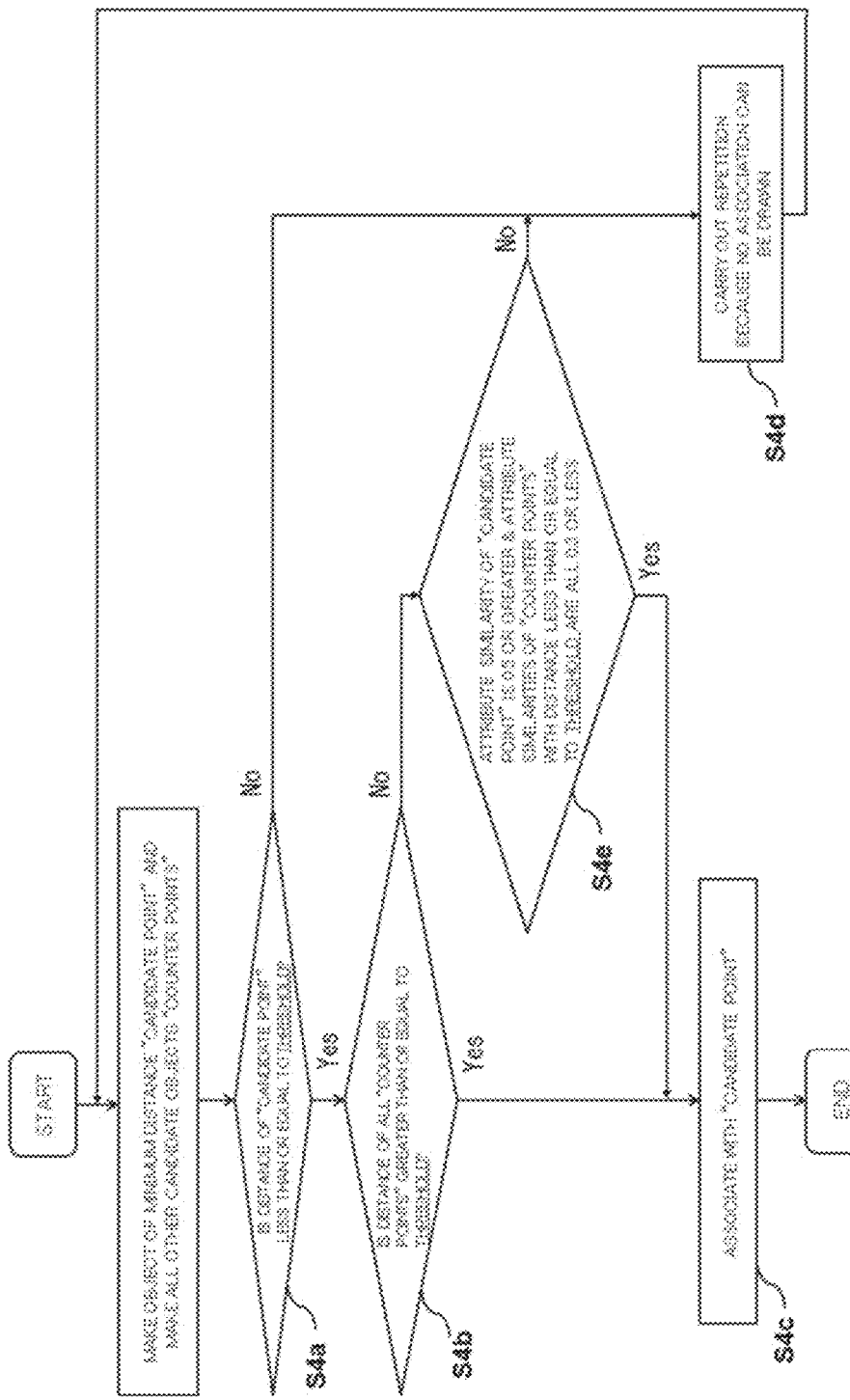
FIG. 8 is a diagram to show an example of the process flow in a judging process section 74.

FIG. 8 is a diagram to show an example of the process flow in the judging process section 74. First, as described above, where the sensing object A1 is sensed in the sensor A (image analyzing section 40), associations of the sensing objects B1 and B2 sensed in the sensor B (radio wave detection section 30) are judged. In this case, the object with the shortest distance is made a candidate point, and all the other candidate objects are made counter points. For example, in the example shown in FIGS. 6A and 6B, the sensing object B2 is the candidate point, and the sensing object B1 is the counterpoint. Next, the distance DA1B2 between the sensing object B2 and the sensing object A1 is compared against the threshold DTH, and whether or not DA1B2≤DTH is fulfilled (whether the candidate object B2 is present in an area within the threshold) is judged as the criterion for the distance of the candidate point (S4a). Also, similarly, the distance DA1B1 between the sensing object B1 and the sensing object A1 is compared against the threshold DTH, and whether DA1B1>DTH is fulfilled (whether there is no sensing object B1 in areas within the threshold) is judged as the criterion for the distance from the other counterpoint (S4b). Then, with the present example embodiment, when both criteria are fulfilled, an association judging result to indicate that the candidate object B2 is the same as (is associated with) the object A1 is output (S4c).

On the other hand, if the threshold judgement for the first candidate object B2 does not fulfill the criterion, it is judged that no associations can be drawn, and whether associations can be drawn or not is judged again at the timing the next location estimation result is obtained (S4d).

Furthermore, if the threshold judgement (S4a) for the sensing object B2, which is the first candidate object, fulfills the criterion, and the threshold judgement (S4b) for the next, the other counter sensing object B1 does not fulfill the criterion (that is, only when a plurality of candidate and counter points are present in areas within the threshold), associations are judged based on the similarities of attributes (S4e). When associations are judged based on the similarities of attributes, for example, whether the attribute similarity of the sensing object B2, which is a candidate object B, is 0.5 or higher (the attributes are judged similar), and the attribute similarity of the sensing object B1, which is the only other counter object present in the threshold range, is less than 0.3 (their attributes are judged not similar), is judged (S4e). When this condition is fulfilled, an association judging result (S4c) to indicate that the candidate object B2 is the same as (is associated with) the object A1 is output. On the other hand, if this condition is not fulfilled, it is judged that no associations can be drawn (the association candidates cannot be narrowed down to one), and the judging of associations is repeated again at the timing the next location estimation result or attribute estimation result is obtained (S4d). For example, in the example shown in FIG. 7, the attribute similarity between A1 and B2 is 0.72 (0.5 or higher) in the attribute "person (talking)", and the attribute similarity between A1 and B1 is 0.27 (less than 0.3) in the attribute "person (standby)", so that the conditions in FIG. 8 are fulfilled, and the sensing object B2 is output as being able to be associated with the sensing object A1.

Also, when, as described earlier, the association judging section 21 judges that objects sensed in various types of sensors such as the radio wave detection section 30 and the image analyzing section 40 are associated with each other (or the same), the sensor fusion section 20 improves the accuracy of the location of the object by integrating the location estimation information of the object from each sensor analyzing section, in the location information integration section 22. As for the method for integrating the location estimation information, for example, a method in which, based on the accuracy information (probability distribution, standard deviation, etc.) of location estimation for the object, output from the radio wave detection section 30 and the image analyzing section 40, a joint probability distribution to combine both probability distributions, using their reliabilities as likelihoods, is used. Alternatively, a method may be used, in which the location estimation results output from the radio wave detection section 30 and the image analyzing section 40 are weighted and averaged (weighted averaging) based on the reliability of the accuracy information (standard deviation, variance, etc.) of each location estimation result.

Furthermore, in another similar technique, the identification information and attribute information of the object from each sensor analyzing section is integrated in the identification information integration section 23, so that the identification information of the object is improved in accuracy. For example, referring to the example shown in FIG. 7, the sensing object B2 is associated with the sensing object A1, and the association judging section 21 outputs the maximum attribute similarity 0.72 in the attribute "person (talking)". That is, even in the identification information integration section 23, the sensing objects A1 and B2 are the same, and therefore can be output as being likely to be a person talking on the phone. Furthermore, in the example shown in FIG. 7, information to indicate that the sensing object A1 is a person and is likely to be talking on the phone or operating a terminal is input from the image analyzing section 40, and information to indicate that the sensing object B2 is likely to be a person talking on the phone or a UAV engaged in image transmission is input from the radio wave detection section 30. The identification information integration section 23 may process these pieces of information in the same manner as in the similarity calculation section 71 and finds the joint probability (product) of the degrees of matching, and, output "person talking on the phone" (probability 0.72=72%), as the result of the integration of the attribute information.

Figure 9:
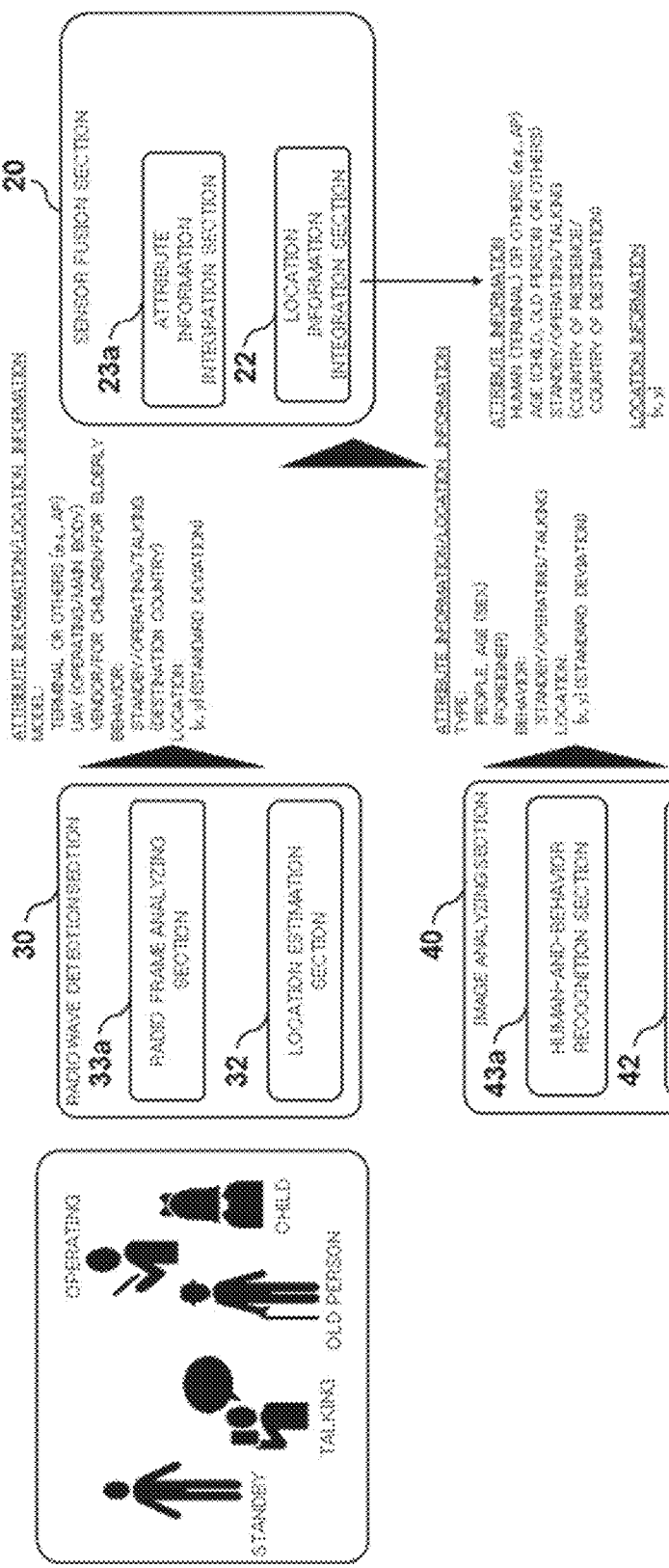
FIG. 9 is a diagram to show an application example of the first example embodiment.

FIG. 9 is a diagram to show an application example of the first example embodiment. This is an example of improving the accuracy of integration and tracking by using attributes and behavior information based on image analysis and radio wave detection, for people walking through or having an appointment in a public area or elsewhere.

In addition to the process of the radio frame analyzing section 33, described with reference to FIG. 1 and FIGS. 4A to 4E, the radio frame analyzing section 33 in the radio wave detection section 30 judges whether the radio device's model is a terminal (smartphone, mobile terminal, loT terminal, UE, etc.) or an AP (access point, base station, mobile router, etc.). In this case, for example, in the event a Wi-Fi signal is used, the radio frame is analyzed. If a probe request frame or the like is found, it is possible to judge the attribute of the transmitting source as being a terminal, and, if a beacon, a probe response frame or the like is used, it is possible to judge the attribute of the transmitting source as being an AP. Note that, in the case of LTE, if FDD is employed, it is possible to judge the attributes of uplink communication (terminal side) and downlink communication (base station side), from the frequency band and the like. Furthermore, in the event a terminal is used, it is possible to judge whether the terminal is a mobile phone for children or for the elderly, by identifying the product vendor from the OUI (Organizationally Unique Identifier) code in the first-half of the MAC address, which is in the radio frame, or, depending on the model, by analyzing the model name or the like from the second-half. Also, regarding the behavior information, if the OUI registration country of the product vendor of that model matches the country of sale, it is possible to estimate information related to the country of residence or the country of destination. Furthermore, when Wi-Fi is used, the SSID name of an AP connected in the past may be included in the probe request frame from the terminal, so that, if the country where the AP is installed is found out, there is a possibility that information that is equivalent to the country of residence or the country of destination can be also estimated.

In addition to the process of the object-and-behavior recognition section 43, described with reference to FIG. 1 and FIG. 3, the human-and-behavior recognition section 43b estimates the age and sex of a sensed person, whether the person is more likely a fellow countryman or a foreigner, and so forth, using an engine for estimating people's age and sex and/or the like, as an image analyzing engine.

Then, the sensor information integration section (sensor fusion section 20), by means of the association judging section 21 in FIG. 2, judges the associations between objects through the association judging process described with reference to FIG. 5 to FIG. 8, and, after that, integrates the sensor information and improves the accuracy in the attribute information integration section 23a and the location information integration section 22.

In the similarity calculation section 71 and the attribute information integration section 23a, in addition to each attribute information described with reference to FIG. 1 and FIG. 7, the age attribute of a sensed person (for example, whether the sensed person is a child or an old person, or neither), the model attribute as to whether the person has a terminal or an AP, destination country information as to whether the person is a fellow countryman or a foreigner, and so forth, can be used as attribute (behavior) information. That is, the similarity calculation section 71 can use the above additional attribute information as attribute similarities for linking. The attribute information integration section 23a can produce an output to indicate what attributes (behavior) are likely, based on the joint probability of the second attribute information from the image analyzing section 40 and the first attribute information from the radio wave detection section 30, including the above additional attribute information.

Figure 10B:
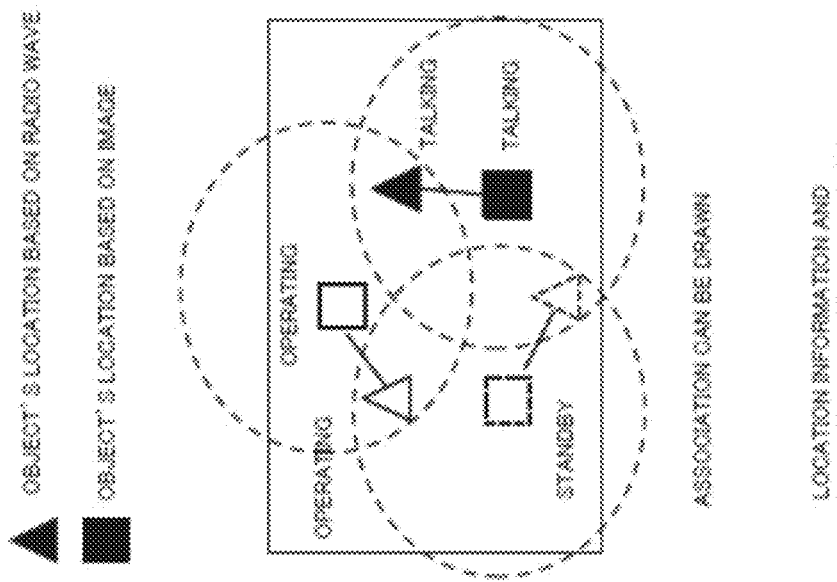
Figure 10A:
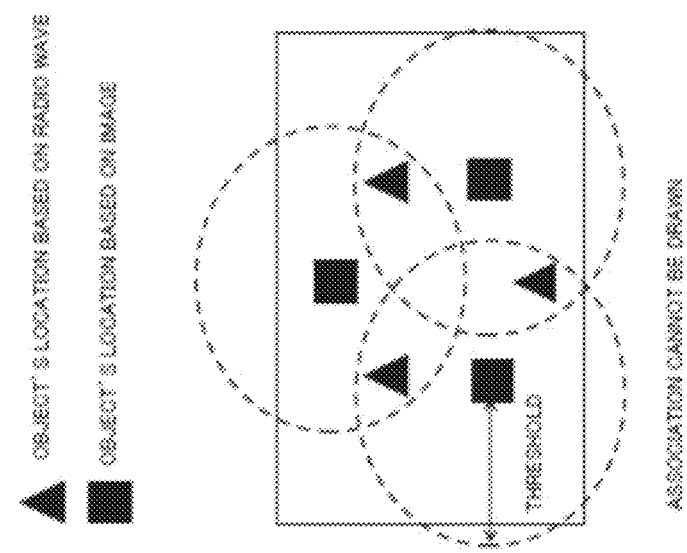

FIGS. 10A and 10B provide diagrams to show an example of an advantageous effect according to the present example embodiment. As described earlier, according to the present example embodiment, in addition to the location estimation process in various types of sensors such as the radio wave detection section 30 and the image analyzing section 40, the process for estimating attribute information (behavior information) is added, and each attribute's similarity is calculated and used in judging the associations between objects, so that it is possible to judge associations with higher reliability. To be more specific, the radio wave detection section 30 includes a radio frame analyzing section 33 that estimates the attributes (behavior) of radio terminals and/or the like. The image analyzing section 40 includes an object-and-behavior recognition section 43 that estimates the attributes (behavior) of people and things. The sensor fusion section 20 calculates the similarities between the attributes of individual objects in the similarity calculation section 71, and uses information about these attribute similarities in judging associations. By this means, as shown in FIG. 10A even in cases in which individual objects are present nearby according to the location information alone and cannot be associated then, as shown in FIG. 10B by using information of attribute similarities, it is still possible to judge that associations can be drawn with high reliability.

Also, as a secondary advantageous effect, if sensor information can be integrated (associated) with high accuracy, attribute information that is obtained can be complementarily combined and complemented. By this means, the performance of identifying objects can also be improved. To be more specific, various types of attribute information (behavior information) based on image analysis and radio wave detection can be integrated with high accuracy in the identification information integration section 23, so that, for example, it is possible to estimate that "a child operating a UAV" has been detected.

3. SECOND EXAMPLE EMBODIMENT

Next, the sensor information integration system according to a second example embodiment will be described. In this sensor information integration system, the association judging section calculates individual weighting coefficients from location information that is estimated and input from each sensor, and the reliability of attribute (behavior) information, and uses the values, in which weighted distance information and attribute similarity information are integrated, in judging associations.

(1) CONFIGURATION

FIG. 11 is a diagram to show an overall configuration of a sensor information integration system 101 according to the second example embodiment. As in the first example embodiment, the sensor information integration system 101 according to the second example embodiment includes various types of sensor analyzing sections (radio wave detection section 30 and image analyzing section 40) and a sensor fusion section 20. Also, the sensor information integration system 101 may include one or more radio wave sensors 31 and one or more cameras 41, as data input means, as in the first example embodiment described above. The radio wave detection section 30 includes a location estimation section 32 and a radio frame analyzing section 33b. Furthermore, the image analyzing section 40 includes a location estimation section 42 and an object-and-behavior recognition section 43b. Note that the sensor information integration system 101 may include, as various types of sensor analyzing sections, analyzing sections such as active radars, various types of lasers (LiDAR), and acoustic sensors.

Also, the sensor fusion section 20 integrates location estimation information, accuracy information, attribute (behavior) information and so forth, which are from various types of sensor analyzing sections (radio wave detection section 30 and image analyzing section 40), for improved accuracy. Therefore, the sensor fusion section 20 includes an association judging section 21b, a location information integration section 22, an identification information integration section 23b and so forth.

Figure 12:
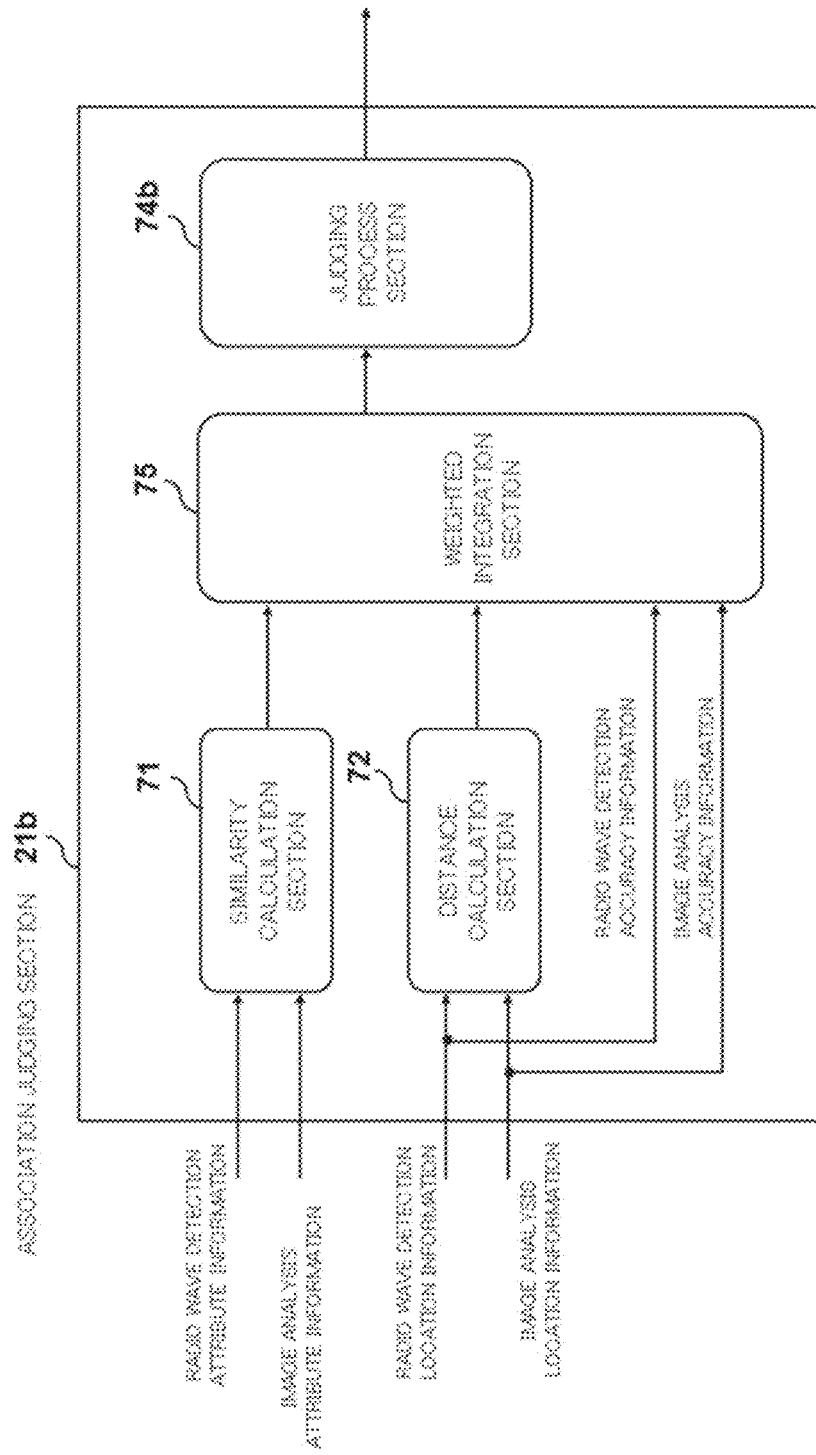
FIG. 12 is a diagram to show an example of the configuration of the association judging section 21b shown in FIG. 11.

FIG. 12 is a diagram to show an example of the configuration of the association judging section 21b shown in FIG. 11. The association judging section 21b includes a similarity calculation section 71, a distance calculation section 72, and a judging process section 74b, and further includes a weighting integration section 75, which is a configuration unique to the second example embodiment.

The weighting integration section 75, using the accuracy information of location estimation based on the location information of the first object and the location information of the second object, weights and synthesizes the similarities calculated in the similarity calculation section 71 and the distances calculated in the distance calculation section 72. To be more specific, the weighting integration section 75 standardizes both the similarities between objects, calculated in the similarity calculation section 71, and the distances between objects, calculated in the distance calculation section 72, and then carries out the process of weighting and integrating these similarities and distances, based on the accuracy information of location estimation. Then, the judging process section 74 judges associations based on the integrated information of the degrees of matching. Here, the case in which the accuracy information of location estimation based on radio wave detection and image analysis is input is by no means limiting, and the weighting integration section 75 may also have the accuracy information of each attribute information as input, and perform the above weighting using these pieces of information.

(2) OPERATION

The operation of the second example embodiment will be described with reference to FIG. 11 to FIG. 14.

Figure 13:
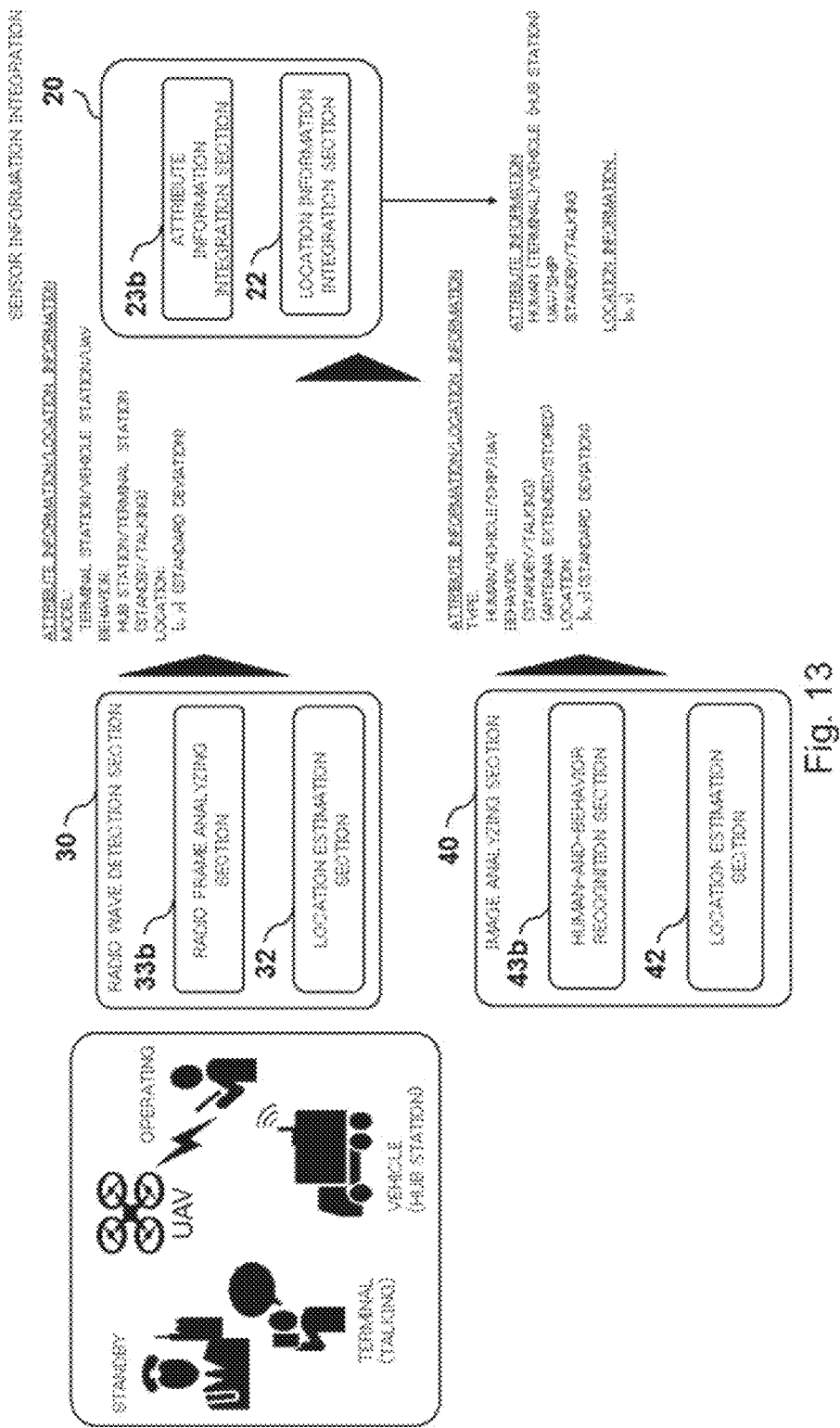
FIG. 13 is a diagram to show an application example of the second example embodiment.

FIG. 13 is a diagram to show an application example of the second example embodiment. This is a diagram, which relates to the operation of privately-owned business wireless networks for police, firefighting, disaster prevention, defense and so forth, and which shows an example of the case of monitoring the configuration of business wireless networks, investigating the behavior of workers/employees and sensing irregular events, using attribute information (behavior information) based on image analysis and radio wave detection.

As for the operation of the second example embodiment, as shown in FIG. 11, first, in various types of sensor analyzing sections such as the radio wave detection section 30 and the image analyzing section 40, an object (the first object, the second object, etc.) is sensed and identified, and the process of estimating the location of this objects is carried out. For example, in the radio wave detection section 30, the radio frame analyzing section 33b analyzes the attribute (behavior) information of the radio transmitters. Also, in the image analyzing section 40, the object-and-behavior recognition section 43b recognizes the object on images of the object, and estimates its behavior. Note that, during the process of estimating the location of the object in each sensor analyzing section, the location estimation sections 32 and 42 may calculate the accuracy information of location estimation. As for examples of the accuracy information, the standard deviation or variance of location estimation probabilities is used.

The operation that is unique to the radio frame analyzing section 33b in the second example embodiment will be described. As shown in FIG. 13, the radio frame analyzing section 33b performs the process of identifying mobile terminals, vehicle terminals, sensor stations, hub stations (gateways) and so forth, based on differences in transmission power, the number of transmission packets and so forth, in addition to the process of identifying mobile terminals, UAVs and so forth in the radio frame analyzing section 33, described with reference to FIG. 1 and FIGS. 4A to 4E. This process focuses on the fact that vehicle terminals often play the role of gateways and hub stations in sensor networks. To be more specific, when a vehicle terminal is used, signals tend to be output with higher transmission power than when a mobile terminal (sensor stations) is used. In addition, when a hub station (gateway) is used, there is a tendency that more packets are output than when a mobile terminal (sensor station) alone is used. For example, sensor stations, hub stations and the like can be classified by pre-learning or analytically processing their radio frames in the same manner as in the radio frame analyzing section 33. Similar to the first example embodiment, the radio frame analyzing section 33b outputs these identification results (classification results, the probability of being each attribute object, the degrees of matching, etc.), as the first attribute information (behavior information).

The operation that is unique to the object-and-behavior recognition section 43b of the second example embodiment will be described. The object-and-behavior recognition section 43b enhances the process of the object-and-behavior recognition section 43 described with reference to FIG. 1 and FIG. 3, to perform the process for identifying not only people and UAVs, but also vehicles, ships and so forth. For example, similar to the object-and-behavior recognition section 43, the object-and-behavior recognition section 43b learns these images in advance by means of a recognition engine using machine learning or the like, or analyzes the characteristics that objects in these images have, so that the object-and-behavior recognition section 43b can identify vehicles, ships and so forth. Also, the object-and-behavior recognition section 43b may classify the state of antennas being extended and/or stored, as behavior of vehicles or ships, based on image analysis. If a vehicle or a ship has its antenna extended, it is likely that the vehicle or the ship is engaged in wireless communication, and, if the antenna is stored, it is likely that the vehicle or the ship is not engaged in wireless communication. Generally, if a hub station or a gateway is used, a high antenna that can be seen from the surroundings may be installed. The object-and-behavior recognition section 43b outputs the recognition results (classification results, the probability of being each recognition object, the degrees of matching, etc.) as the second attribute information (behavior information).

Next, using the attribute information (behavior information) and location information (accuracy information) output from various types of sensor analyzing sections such as the radio wave detection section 30 and the image analyzing section 40, first, the sensor fusion section 20 judges, by means of the association judging section 21b, which objects sensed by the various sensors correspond to each other (that is, judges the identification, linking, etc.). Then, when this judging of associations by the association judging section 21 of the sensor fusion section 20 finds out that a plurality of sensor analyzing sections have sensed the same (associated) object, the location estimation information related to that object from each sensor analyzing section is integrated in the location information integration section 22, thereby improving the accuracy of the object's location information. Also, similarly, the accuracy of the object's identification information is improved by integrating the object's attribute information, identification information and so forth from each sensor analyzing section, in the identification information integration section 23b of the sensor fusion section 20.

Figure 14:
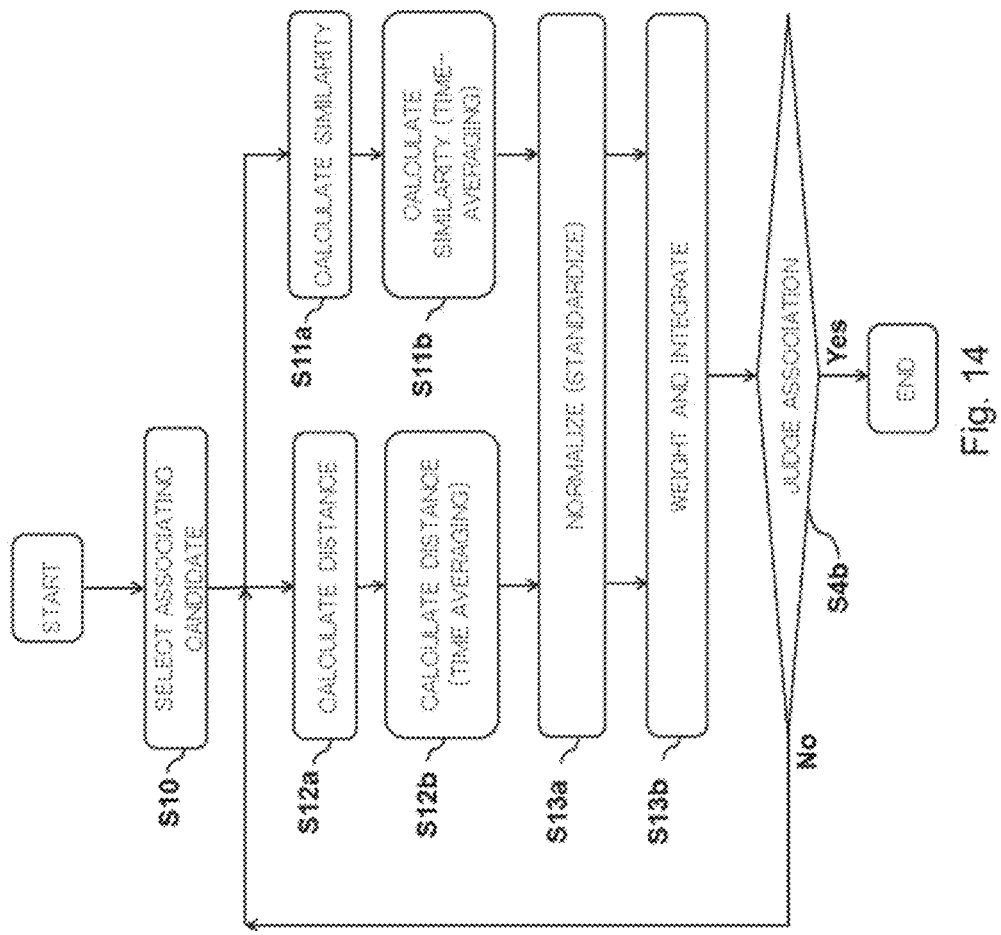
FIG. 14 is a diagram to show the operation sequence of the association judging process in the association judging section 21b according to the second example embodiment.

The operation of the association judging section 21b in the sensor fusion section 20 will be described in detail, with reference to FIG. 11 to FIG. 14. FIG. 14 is a diagram to show the second example of the operation sequence of the association judging process in the association judging section 21b. Referring to example shown in FIG. 14, an example case to judge which of the sensing objects B1 and B2 of the sensor B (for example, the radio wave detection section 30) is associated with the sensing object A1 of the sensor A (for example, the image analyzing section 40), as in the first example embodiment, will be described.

First, as in the first example embodiment, on an as-needed basis, selection is made to determine which object sensed by the radio wave detection section 30 can be an associating candidate for the object sensed in the image analyzing section 40 (S10: associating candidate selection). Then, as in the first example embodiment, the distance calculation section 72 calculates the distances between objects sensed by each sensor (S12a: distance calculation). Here, considering the case where the conditions for drawing associations are not fulfilled in the association judging process (described later) and the association judging process has to be repeated, the average of the distances calculated over time may be found (S12b: distance calculation (averaging)).

Also, as in the first example embodiment, the similarity calculation section 71 performs the similarity calculation process of the attribute (behavior) information (S11a: similarity calculation). To be more specific, given the object sensed in the sensor A (image analyzing section 40), the attribute similarities of the objects sensed in the sensor B (radio wave detection section 30), each an associating candidate, are calculated. Here, considering the case where the conditions for drawing associations are not fulfilled in the association judging process (described later) and the association judging process has to be repeated, in the process of calculating attribute similarities, too, the average of the similarities calculated over time may be found (S11b: similarity calculation (averaging)), as in the distance calculation process.

Next, as a process unique to the second example embodiment, the weighting integration section 75 performs the process of normalizing (standardizing) the information about the distances between sensing objects calculated in the distance calculation section 72 and the information about the attribute similarities s between sensing objects calculated in the similarity calculation section 71, and then weighting and integrating these pieces of information. First, the distance information between sensing objects and the attribute similarity information between sensing objects are both normalized (standardized) (S13a: normalization (standardization) process). For example, when an attribute similarity in the range of 0.0 to 1.0 (0.0 or higher, and 1.0 or less) is output as a degree of matching with each attribute (behavior), the attribute similarity is normalized (standardized) as it is), so that the value, as it is, is output as a normalized attribute similarity. On the other hand, the distance information indicates that the smaller the value, the nearer the distance, and therefore the higher the degree of matching, and the larger the value, the greater the distance, and therefore the lower the degree of matching. Therefore, for example, the average value of the accuracy information (standard deviation×3) of location estimation in the radio wave detection section 30 is α (α=3σ), and the degree of matching β of the distance information is β={(a-calculated distance)/a}, both standardized and output. By this means, the degree of matching β when a short distance (near 0) is calculated approaches 1, and the degree of matching β when a long distance is calculated (near the standard deviation×3) approaches 0.

Then, the standardized degree of distance matching β and the normalized attribute similarity are both weighted and integrated (S13b: weighting integration process). For example, the integration is done as follows: {weighted and integrated degree of matching}=γ×(standardized degree of distance matching β)+(1−γ)×(normalized attribute similarity). If the standardized degree of distance matching β and the normalized attribute similarity are applied the same weight and integrated, γ=0.5 is calculated. Also, depending on the accuracy information of location estimation and the operating environment, if the reliability of the distance information is higher than the attribute similarity, the value of γ is made greater than 0.5, closer to 1, and, if the reliability of the distance information is lower than the attribute similarity, the value of γ is made smaller than 0.5, closer to 0. By this means, each degree of matching and similarity are weighted and integrated, based on the accuracy information of location estimation and attribute estimation. Here, the weighting integration section 75 receives as input only the accuracy information of location estimation based on radio wave detection and image analysis, and calculates the weighting coefficient γ in a relative manner, on assumption that the accuracy information of attribute information is fixed, but this is by no means limiting. That is, the weighting integration section 75 may also receive as input each attribute information's accuracy information, and calculate the weighting coefficient γ using these pieces of information.

Finally, the judging process section 74b judges the associations based on the weighted and integrated information of the degrees of matching. For example, assuming that an object A1 is sensed in the sensor A (image analyzing section 40), among all the associating candidates sensed by the sensor B (radio wave detection section 30), such as objects B1 and B2, the object B2 where the weighted and integrated degree of matching has the maximum value is made a candidate point, and all the other objects, such as B1, are made counter points. Then, for example, if the candidate point's integrated degree of matching is 0.7 or higher, and all the other counter points have integrated degrees of matching less than 0.3, the candidate point B2 is output as being able to be associated. On the other hand, when the above condition is not fulfilled (that is, when the candidate point's integrated degree of matching is less than 0.7, or when the integrated degree of matching in one of the other counter points is 0.3 or higher), it is judged that associations cannot be drawn, and, when the information of sensed objects is updated, the process in the association judging section 21b is repeated again.

Also, as in the first example embodiment, when the association judging section 21b judges that objects sensed in various types of sensors such as the radio wave detection section 30 and the image analyzing section 40 are associated with each other (or the same), the sensor fusion section 20 improves the accuracy of the locations of that object by integrating the location estimation information of that object from each sensor analyzing section, in the location information integration section 22. Also, as in the first example embodiment, the sensor fusion section 20 improves the accuracy of an object's identification information by integrating the identification information and attribute information (behavior information) of that object from each sensor analyzing section, in the identification information integration section 23b.

As shown in FIG. 13, the similarity calculation section 71 and the identification information integration section 23b can integrate the attribute information that is unique to the second example embodiment. For example, people, vehicles, UAVs, ships and/or the like are estimated from attribute information (behavior information) provided based on image analysis, and, furthermore, attribute information (behavior information) provided based on radio wave detection is integrated. By this means, it is possible to estimate which object, among the objects described above, is a hub station (gateway), which object is a terminal (sensor station), and so forth. Also, the accuracy of their estimation can be improved by combining with each antenna's state of extension and contraction, based on image analysis. As a result of this, it is possible to estimate the configuration of the entire network of the sensor network, which is the sensing object, and estimate the on-board devices and locations of each hub station and sensor station.

That is, the similarity calculation section 71 can use the attribute information unique to the second example embodiment, as attribute similarities for linking. Based on the integration and the joint probability of the attribute information from the image analyzing section 40 and the attribute information from the radio wave detection section 30, including the above-described pieces of attribute information, the identification information integration section 23b produce outputs to indicate what attributes (behavior) are likely, for example. That is, once associations are drawn by the association judging section 21b, the attribute information based on image analysis and the attribute information based on radio frame analysis may be combined, and if one attribute information is unreliable by itself, it is possible to output attribute information (behavior information) that complements that attribute information.

As described above, in the second example embodiment, as in the first example embodiment, in addition to the location estimation process in various types of sensors such as the radio wave detection section 30 and the image analyzing section 40, the process for estimating attribute information (behavior information) is added, and each attribute's similarity is calculated and used in judging the associations between objects, so that it is possible to judge associations with higher reliability. To be more specific, the radio wave detection section 30 includes a radio frame analyzing section 33b that estimates the attributes (behavior) of radio terminals and/or the like, and the image analyzing section 40 includes an object-and-behavior recognition section 43b that estimates the attributes (behavior) of people and things. Also, the sensor fusion section 20 calculates the similarities between the attributes of individual objects in the similarity calculation section 71, and uses information about these attribute similarities in judging associations. By this means, even in cases in which individual objects are present nearby according to the location information alone and cannot be associated then, by using the information of attribute similarities, it becomes possible to draw associations with high reliability.

In this case, there is a unique advantageous effect to the second example embodiment, which is that, since information about the similarities of attribute information (behavior information) between each sensing object and information about the distances between each sensing object using location estimation results are both normalized (standardized), and then weighted based on information such as the accuracy of location estimation or the like, and used in judging associations, so that it is possible to judge associations by taking into account the reliability of both information. That is, if the accuracy of location estimation is high, the information about the distances is given heavier weight, and, if the accuracy of location estimation is low, the information about the distances is given lighter weight. By this means, it is possible to draw associations more flexibly and adaptively, with improved reliability. Note that, with the first example embodiment, when judgement of whether associations can be drawn or not based on distance information is suspended, associations are drawn based on attribute information.

Also, as in the first example embodiment, there is a secondary advantageous effect that, if sensor information can be integrated (associated) with high accuracy, attribute information that is acquired can be complementarily combined and complemented, so that the performance of object identification also improves with finer granularity. To be more specific, the identification information integration section 23b can integrate various types of attribute information (behavior information) based on image analysis and radio wave detection, with high accuracy. For example, it is possible to estimate, for example, that "two vehicles, one UAV, and 16 people are sensed in the sensing area, and, of these, one vehicle on the right side is equipped with a sensor network hub station (gateway), and, of the one UAV and 16 people, 10 workers in the right area presently hold terminal stations (sensor stations) and are communicating".

(3) EXAMPLE ALTERATION

Also, although examples of two-dimensional location coordinates (plane coordinates) have been primarily described as above with the first example embodiment and the second example embodiment, the sensor information integration system and the sensor information integration system to which the present invention is applied can be enhanced so as to be applicable to three-dimensional location coordinates (spatial coordinates) as well. That is, the directional axes in the distances calculated in the above-described distance calculation section may include at least two directional axes among the angular direction, the depth direction, and the altitude direction.

Figure 15:
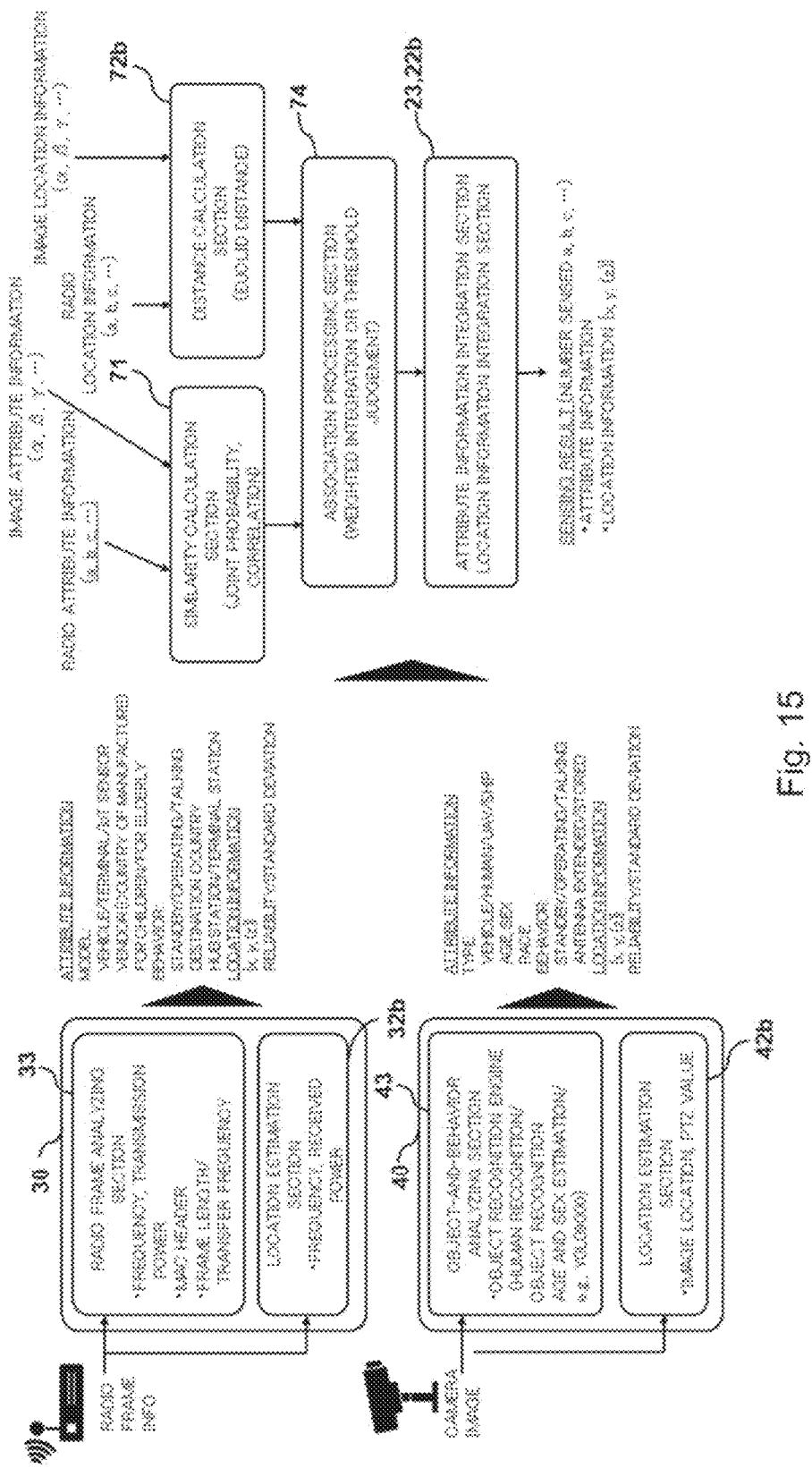
FIG. 15 is a diagram to show an overall image of the sensor integration system when enhanced so as to be applicable to three-dimensional space.

FIG. 15 is a diagram to show an overall image of the sensor integration system enhanced so as to be applicable to three-dimensional space. When enhanced to three-dimensional space, the processes in the location estimation section 32b of the radio wave detection section 30, the location estimation section 42b of the image analyzing section 40, and the distance calculation section 72 and the location information integration section 22b of the sensor fusion section 20 are enhanced to processes for three-dimensional space. That is, enhancement to three-dimensional space is made possible by using three-dimensional location estimation information, accuracy information, distance information (Euclidean distance information) and so forth.

The basic technique is the same as the techniques described in the first example embodiment and the second example embodiment. Also, by using three-dimensional information, it is possible to improve the reliability of attribute information between people or vehicles that are present on the ground, and UAVs or the like that fly at a certain altitude.

4. THIRD EXAMPLE EMBODIMENT

Figure 16:
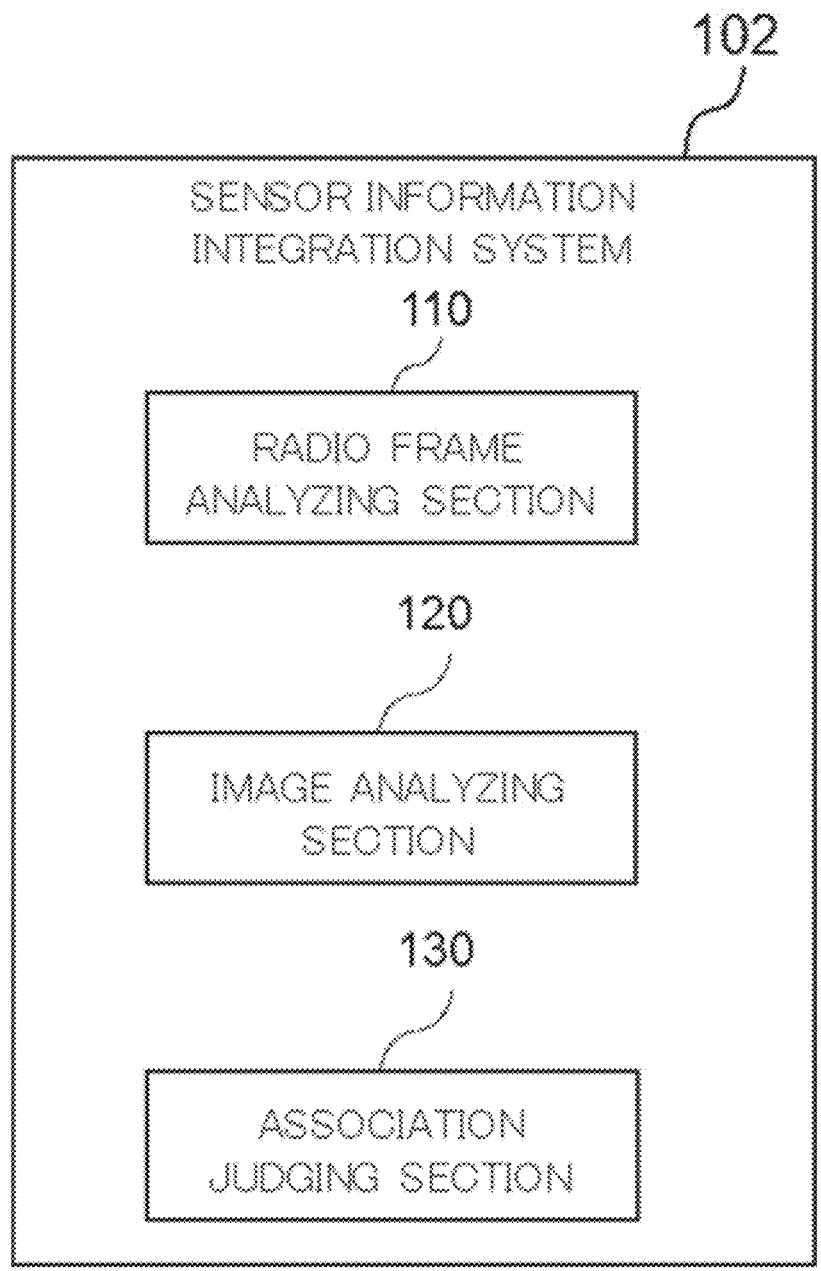
FIG. 16 is a block diagram to show an example of a schematic configuration of a sensor information integration system 102 according to a third example embodiment.

Next, a third example embodiment of the present invention will be described with reference to FIG. 16. Although the first example embodiment and the second example embodiment described above have illustrated specific example embodiments, the third example embodiment will illustrate a more generalized example embodiment.

An example of the configuration of the sensor information integration system 102 according to the third example embodiment will be described with reference to FIG. 16. FIG. 16 is a block diagram to show an example of a schematic configuration of the sensor information integration system 102 according to the third example embodiment. Referring to FIG. 16, the sensor information integration system 102 includes a radio frame analyzing section 110, an image analyzing section 120, and an association judging section 130.

According to the sensor information integration system 102 having the above configuration, the radio frame analyzing section 110 analyzes the radio frame transmitted from the first object, and extracts the first attribute information related to the first object. The image analyzing section 120 analyzes images in which a second object is sensed, and, from a plurality of pieces of attribute information that are based on at least one of a plurality of images and information about one or more objects, extracts the second attribute information related to the second object. The association judging section 130 judges the association between the first object and the second object by using the first attribute information and the second attribute information.

For example, the sensor information integration system 102 may operate the sensor information integration systems 100 and 101 according to the first example embodiment or the second example embodiment described above.

5. ADVANTAGEOUS EFFECTS OF EXAMPLE EMBODIMENTS

According to the above example embodiments, the following advantageous effects can be expected.

The first advantageous effect is that objects sensed in various types of sensors such as a radio wave detection section and an image analyzing section can be associated (identified, linked, etc.) with each other, with high reliability. The reason is that the process of estimating attribute information (behavior information) is added, in addition to the location estimation process in various types of sensors such as the radio wave detection section and the image analyzing section. Also, another reason is that, by calculating and using each attribute information's similarity in judging the associations between each object, it is possible to judge associations with higher reliability. To be more specific, the radio wave detection section includes a radio frame analyzing section that estimates the attributes (behavior) of radio terminals or the like. The image analyzing section includes an object-and-behavior recognition section that estimates the attributes (behavior) of people or things. A sensor fusion section calculates the similarities between the attributes of individual objects by means of a similarity calculation section, and uses information about these attribute similarities in judging associations. By this means, even in situations in which individual objects are present nearby according to the location information alone and cannot be associated then, by using the information of attribute similarities, it is still possible to judge that associations can be drawn with high reliability.

Also, there is a second advantageous effect that objects sensed in various types of sensors such as the radio wave detection section and the image analyzing section can be associated with each other in a shorter time (in a smaller number of repetitions). The reason is that a threshold calculating means for dynamically changing the threshold by using the accuracy information at the time of location estimation in various types of sensors such as the radio wave detection section and the image analyzing section, a similarity calculating means for calculating the similarities of attribute information from various types of sensors, and an association judging means for judging associations by using these thresholds and attribute similarities. By this means, first, it is possible to judge associations by adaptively setting (dynamically changing) the threshold according to the location estimation errors (accuracy information) from various types of sensors. Therefore, contrary to a reference technique in which a fixed threshold with a margin is set in order to prevent drawing wrong associations, accuracy information that changes every time location estimation is carried out is utilized actively, so that there is a higher possibility that it is possible to judge that associations can be drawn, at an earlier stage than in the reference technique, while maintaining high reliability. Furthermore, there is an advantageous effect that, even when objects are present nearby and cannot be associated using distance information alone, associations can be drawn with high reliability, in a shorter time (in a smaller number of repetitions), by additionally judging associations using attribute similarity information.

In particular, there is an advantageous effect that is unique to the second example embodiment, which is that, since information about the similarities of attribute information (behavior information) between each sensing object and information about the distances between each sensing object using location estimation results are both normalized (standardized), and then weighted based on information such as the accuracy of location estimation or the like, and used in judging associations, so that it is possible to judge associations by taking into account the reliability of both information. That is, if the accuracy of location estimation is high, the information about the distances is given heavier weight, and, if the accuracy of location estimation is low, the information about the distances is given lighter weight. By this means, it is possible to draw associations more flexibly and adaptively, with improved reliability. By this means, it is possible to draw associations in a shorter time (in a smaller number of repetitions), with high reliability.

A third advantageous effect is a secondary one, which is that the granularity of identification information of sensed objects and the accuracy of their estimation are improved. The reason is that, as explained with the first advantageous effect and the second advantageous effect described above, if sensor information can be integrated (associated) with high accuracy, attribute information that is obtained can be complementarily combined and complemented. That is, the granularity of the performance for identifying objects is also improved. To be more specific, this is because the identification information integration section makes it possible to integrate, with high accuracy, various types of attribute information (behavior information) derived based on image analysis, radio wave detection and so forth. Also, even when there is attribute information (behavior information) that cannot be estimated using one type of sensor alone, by associating between information from a plurality of sensors and by combining this with attribute information (behavior information) that can be estimated in other sensors, it becomes possible to estimate attribute information (behavior information) of a variety of granularities.

For example, there is also an advantageous effect that it is possible to estimate that "a child operating a UAV is detected", "two vehicles, one UAV, and 16 people are detected in the sensing area, and, of these, one vehicle at point {x, y} on the right side is equipped with a sensor network hub station (gateway), and, of the one UAV and 16 people sensed, 10 workers in the right area presently hold terminal stations (sensor stations) and are communicating", and so forth.

A fourth advantageous effect is high flexibility and scalability for various types of sensors. The reason is that, as described with the first example embodiment and the second example embodiment, the sensor information integration system to which the present invention is applied includes sensor information integrating functions and interfaces that are designed to provide support for a variety of types of sensors, such as image analysis using cameras, radio wave detection using radio wave sensors, radar analysis using various radars, various types of laser analyses (for example, LiDAR), and sound wave detection using acoustic sensors. That is, to give examples of the sensor information integrating functions, it is possible to input and utilize location estimation information and attribute information (behavior information) that take into account the characteristics of various types of sensors, in the processes performed in the distance calculation section and similarity calculation section in the association judging section, and in the association judging section. In this way, attribute information (behavior information) that is estimated in various types of sensors is classified in granularities at which the attribute similarities with other sensors can be calculated, so that any sensor can be supported.

Furthermore, as shown in FIG. 15, the sensor information integration method to which the present invention is applied can support any case, including when integrating location estimation information or attribute information (behavior information) in two-dimensional location coordinates (plane coordinates), when integrating location estimation information and attribute information (behavior information) in three-dimensional location coordinates (spatial coordinates), and so forth.

6. OTHER EXAMPLES

Although example embodiments of the present invention have been described above, the present invention is by no means limited to these example embodiments. It will be understood by those of ordinary skill in the art that these example embodiments are simply examples, and that a variety of changes can be made without departing from the scope and spirit of the present invention.

For example, the steps constituting the processes described in the Specification do not have to be executed in chronological order, following the orders shown in the sequence diagrams. For example, the steps constituting the processes may be executed in orders different from the orders illustrated, or may be carried out in parallel. Also, some steps of the processes may be deleted, or additional steps may be added to the processes.

Some or all of the example embodiments can be described as in the following supplementary notes, but are by no means limited to the following.

(Supplementary Note 1)

A sensor information integration system comprising:
   a radio frame analyzing unit configured to analyze a radio frame transmitted from a first object, to extract first attribute information related to the first object;
   an image analyzing unit configured to analyze an image, in which a second object is sensed, to extract second attribute information related to the second object, from a plurality of pieces of attribute information given based on at least one of a plurality of images and information of one or more objects; and
   an association judging unit configured to judge an association between the first object and the second object, using the first attribute information and the second attribute information.

(Supplementary Note 2)

The sensor information integration system according to supplementary note 1, further comprising an identification information integration unit configured to integrate identification information of an object to be sensed, by using a result of judging the association in the association judging unit, the first attribute information, and the second attribute information.

(Supplementary Note 3)

The sensor information integration system according to supplementary note 1 or 2, further comprising:
   a first location estimating unit configured to estimate location information of the first object from a radio wave; and
   a second location estimating unit configured to estimate location information of the second object from an image,
wherein the association judging unit is configured to judge the association between the first object and the second object, further using the location information of the first object and the location information of the second object.

(Supplementary Note 4)

The sensor information integration system according to supplementary note 3, further comprising a location information integration unit configured to integrate location information of the object to be sensed, by using the result of judging the association in the association judging unit, the location information of the first object, and the location information of the second object.

(Supplementary Note 5)

The sensor information integration system according to supplementary note 3 or 4, wherein the association judging unit comprises:
   a similarity calculation unit configured to calculate a similarity between the first attribute information and the second attribute information; and
   a distance calculation unit configured to calculate a distance between the first object and the second object based on the location information of the first object and the location information of the second object.

(Supplementary Note 6)

The sensor information integration system according to supplementary note 5, wherein the association judging unit further comprises a weighted integration unit configured to perform weighted synthesis of the similarity and the distance, using accuracy information of location estimation given based on the location information of the first object and the location information of the second object.

(Supplementary Note 7)

The sensor information integration system according to supplementary note 5 or 6, wherein distance axes in the distances calculated in the distance calculation unit include axes of at least two of an angular direction, a depth direction, and an altitude direction.

(Supplementary Note 8)

The sensor information integration system according to any one of supplementary notes 1 to 7, wherein the first attribute information includes at least one of:
   information related to an entity in which the first object is installed;
   information related to a communication node to which the radio frame is transmitted; and
   information related to a communication operation of the first object.

(Supplementary Note 9)

The sensor information integration system according to supplementary note 8, wherein the information related to the entity with the first object installed includes at least one of:
   information indicating a type of the entity;
   information related to a model name or a manufacturing vendor of the entity; and
   information related to a country of manufacture or a country of destination of the entity.

(Supplementary Note 10)

The sensor information integration system according to supplementary note 8 or 9, wherein the information related to the communication node to which the radio frame is transmitted includes information related to hub station or a terminal station for a sensor network.

(Supplementary Note 11)

The sensor information integration system according to any one of supplementary notes 8 to 10, wherein the information related to the communication operation of the first object includes information related to an operation of any one of standby, operating, and talking.

(Supplementary Note 12)

The sensor information integration system according to any one of supplementary notes 1 to 11, wherein the second attribute information includes at least one of:
information identifying the second object;
information related to a communication operation of the second object; and
information related to an arrangement of an antenna attached to the second object.

(Supplementary Note 13)

The sensor information integration system according to supplementary note 12, wherein the information identifying the second object includes information indicating a type of the second object, and information related to at least one of an age, sex, and birthplace of a person.

(Supplementary Note 14)

The sensor information integration system according to supplementary note 12 or 13, wherein the information related to the communication operation of the second object includes information related to an operation of any one of standby, operating, and talking.

(Supplementary Note 15)

The sensor information integration system according to any one of supplementary notes 12 to 14, wherein the information related to the arrangement of the antenna attached to the second object includes information related to extension or storage of the antenna.

(Supplementary Note 16)

A sensor information integration method comprising:
analyzing a radio frame transmitted from a first object, to extract first attribute information related to the first object;
analyzing an image, in which a second object is sensed, to extract second attribute information related to the second object, from a plurality of pieces of attribute information given based on at least one of a plurality of images and information of one or more objects; and
judging an association between the first object and the second object, using the first attribute information and the second attribute information.

(Supplementary Note 17)

A program that causes a processor to execute:
analyzing a radio frame transmitted from a first object, to extract first attribute information related to the first object;
analyzing an image, in which a second object is sensed, to extract second attribute information related to the second object, from a plurality of pieces of attribute information given based on at least one of a plurality of images and information of one or more objects; and
judging an association between the first object and the second object, using the first attribute information and the second attribute information.

(Supplementary Note 18)

A non-transitory computer readable recording medium storing a program that causes a processor to execute:
analyzing a radio frame transmitted from a first object, to extract first attribute information related to the first object;
analyzing an image, in which a second object is sensed, to extract second attribute information related to the second object, from a plurality of pieces of attribute information given based on at least one of a plurality of images and information of one or more objects; and
judging an association between the first object and the second object, using the first attribute information and the second attribute information.

This application claims the priority on the basis of Japanese Patent Application No. 2018-203146, filed on Oct. 29, 2018, and its disclosure, including the specification, drawings and abstract, is incorporated herein by reference in its entirety.

INDUSTRIAL APPLICABILITY

By associating between objects sensed by a plurality of sensors, it is possible to draw proper associations when integrating the information estimated by each sensor.

REFERENCE SIGNS LIST

| | |
|---|---|
| 100, 101, 102 | Sensor information integration system |
| 33, 33b, 110 | Radio frame analyzing section |
| 40, 120 | Image analyzing section |
| 21, 21b, 130 | Association judging section |

What is claimed is:

1. A sensor information integration system comprising:
a memory storing instructions; and
one or more processors configured to execute the instructions to:
analyze a radio frame transmitted from a first object, to extract first attribute information related to the first object;
analyze an image in which a second object is sensed, to extract second attribute information related to the second object, from a plurality of pieces of attribute information given based on at least one of a plurality of images and information of one or more objects;
estimate location information of the first object from a radio wave; and
estimate location information of the second object from the image in which the second object is sensed; and
judge an association between the first object and the second object, using the first attribute information and the second attribute information, and using the location information of the first object and the location information of the second object.

2. The sensor information integration system according to claim 1, wherein the one or more processors are further configured to execute the instructions to integrate identification information of a third object to be sensed, by using a result of judging the association, the first attribute information, and the second attribute information.

3. The sensor information integration system according to claim 1, wherein the one or more processors are further configured to execute the instructions to integrate location information of a third object to be sensed, by using a result of judging the association, the location information of the first object, and the location information of the second object.

4. The sensor information integration system according to claim 1, wherein the one or more processors are configured to execute the instructions to:
calculate a similarity between the first attribute information and the second attribute information; and
calculate a distance between the first object and the second object based on the location information of the first object and the location information of the second object.

5. The sensor information integration system according to claim 4, wherein the one or more processors are further configured to execute the instructions to perform weighted synthesis of the similarity and the distance, using accuracy information of location estimation given based on the location information of the first object and the location information of the second object.

6. The sensor information integration system according to claim 4, wherein distance axes in the calculated distance include axes of at least two of an angular direction, a depth direction, and an altitude direction.

7. The sensor information integration system according to claim 1, wherein the first attribute information includes at least one of:
  information related to an entity in which the first object is installed;
  information related to a communication node to which the radio frame is transmitted; and
  information related to a communication operation of the first object.

8. The sensor information integration system according to claim 7, wherein the information related to the entity in which the first object is installed includes at least one of:
  information indicating a type of the entity;
  information related to a model name or a manufacturing vendor of the entity; and
  information related to a country of manufacture or a country of destination of the entity.

9. The sensor information integration system according to claim 7, wherein the information related to the communication node to which the radio frame is transmitted includes information related to hub station or a terminal station for a sensor network.

10. The sensor information integration system according to claim 7, wherein the information related to the communication operation of the first object includes information related to an operation of any one of standby, operating, and talking.

11. The sensor information integration system according to claim 1, wherein the second attribute information includes at least one of:
  information identifying the second object;
  information related to a communication operation of the second object; and
  information related to an arrangement of an antenna attached to the second object.

12. The sensor information integration system according to claim 11, wherein the information identifying the second object includes information indicating a type of the second object, and information related to at least one of an age, sex, and birthplace of a person.

13. The sensor information integration system according to claim 11, wherein the information related to the communication operation of the second object includes information related to an operation of any one of standby, operating, and talking.

14. The sensor information integration system according to claim 11, wherein the information related to the arrangement of the antenna attached to the second object includes information related to extension or storage of the antenna.

15. A sensor information integration method comprising:
  analyzing, by a processor, a radio frame transmitted from a first object, to extract first attribute information related to the first object;
  analyzing, by a processor, an image in which a second object is sensed, to extract second attribute information related to the second object, from a plurality of pieces of attribute information given based on at least one of a plurality of images and information of one or more objects;
  estimating, by the processor, location information of the first object from a radio wave; and
  estimating, by the processor, location information of the second object from the image in which the second object is sensed; and
  judging an association between the first object and the second object, using the first attribute information and the second attribute information, and using the location information of the first object and the location information of the second object.

16. A non-transitory computer readable recording medium storing a program that causes is executable by a processor to perform:
  analyzing a radio frame transmitted from a first object, to extract first attribute information related to the first object;
  analyzing an image in which a second object is sensed, to extract second attribute information related to the second object, from a plurality of pieces of attribute information given based on at least one of a plurality of images and information of one or more objects;
  estimating location information of the first object from a radio wave; and
  estimating location information of the second object from the image in which the second object is sensed; and
  judging an association between the first object and the second object, using the first attribute information and the second attribute information, and using the location information of the first object and the location information of the second object.

* * * * *